United States Patent
Desai et al.

(10) Patent No.: US 11,323,918 B2
(45) Date of Patent: May 3, 2022

(54) SWITCH AND BACKHAUL CAPACITY-BASED RADIO RESOURCE MANAGEMENT

(71) Applicant: Cisco Technology, Inc., San Jose, CA (US)

(72) Inventors: Vishal Satyendra Desai, San Jose, CA (US); Benjamin Jacob Cizdziel, San Jose, CA (US); Pooya Monajemi, Irvine, CA (US); Young Il Choi, San Jose, CA (US); Santosh Babaji Kulkarni, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 19 days.

(21) Appl. No.: 16/752,499

(22) Filed: Jan. 24, 2020

(65) Prior Publication Data

US 2021/0235325 A1 Jul. 29, 2021

(51) Int. Cl.
*H04W 28/20* (2009.01)
*H04W 28/06* (2009.01)
*H04W 88/14* (2009.01)
*H04W 84/18* (2009.01)

(52) U.S. Cl.
CPC ........... *H04W 28/20* (2013.01); *H04W 28/06* (2013.01); *H04W 88/14* (2013.01); *H04W 84/18* (2013.01)

(58) Field of Classification Search
CPC ............... H04W 72/044; H04W 72/04; H04W 72/0453; H04W 28/06; H04W 88/14; H04W 28/20; H04L 1/00; H04L 47/14; H04L 47/22
See application file for complete search history.

(56) References Cited

U.S. PATENT DOCUMENTS

| 8,538,435 | B2 | 9/2013 | Immendorf et al. | |
|---|---|---|---|---|
| 10,805,210 | B1* | 10/2020 | Kondapavuluru | H04L 45/34 |
| 2006/0079200 | A1* | 4/2006 | Hirouchi | H04W 76/50 |
| | | | | 455/404.1 |
| 2011/0228673 | A1* | 9/2011 | Grayson | H04L 47/17 |
| | | | | 370/232 |
| 2013/0035107 | A1* | 2/2013 | Chan | H04W 28/20 |
| | | | | 455/453 |
| 2013/0230052 | A1* | 9/2013 | Gopalakrishna | H04J 3/1611 |
| | | | | 370/401 |

(Continued)

FOREIGN PATENT DOCUMENTS

| KR | 101355109 B1 | 1/2014 |
|---|---|---|
| WO | 2019231923 A1 | 12/2019 |

OTHER PUBLICATIONS

Hariyanto, Hadi et al. "Backhaul-aware scheduling for WiMaX Femtocell with Limited Backhaul Capacity" Tencon 2011, IEEE Region 10 Conference, Nov. 21, 2011 (5 pages).

(Continued)

*Primary Examiner* — Syed Ali
(74) *Attorney, Agent, or Firm* — Merchant & Gould P.C.

(57) ABSTRACT

Systems and methods herein can analyze a bandwidth restriction in a communication stream of an Access Point (AP). Then, based on the bandwidth restriction, the AP can determine a lower amount of wireless bandwidth to provide to station wireless communicating to the AP. The AP can then modify a bandwidth allocation assigned to the station based on the lower amount of wireless bandwidth.

16 Claims, 12 Drawing Sheets

(56) References Cited

U.S. PATENT DOCUMENTS

| | | |
|---|---|---|
| 2015/0249990 A1* | 9/2015 | Kadiyala ............ H04W 72/085 |
| | | 370/252 |
| 2015/0257024 A1 | 9/2015 | Baid et al. |
| 2015/0334602 A1* | 11/2015 | Hencinski ............ H04W 28/20 |
| | | 370/338 |
| 2016/0227432 A1* | 8/2016 | Freeman ........... H04W 72/0453 |
| 2017/0245179 A1 | 8/2017 | Callard et al. |
| 2017/0272310 A1 | 9/2017 | Rengarajan et al. |
| 2018/0091427 A1* | 3/2018 | Kumar .................... H04L 47/32 |
| 2019/0103993 A1 | 4/2019 | Cidon et al. |
| 2019/0182213 A1* | 6/2019 | Saavedra ............ H04L 63/0218 |
| 2020/0014616 A1* | 1/2020 | Michael ................ H04L 45/125 |
| 2020/0287819 A1* | 9/2020 | Theogaraj ............... H04L 45/70 |
| 2020/0374854 A1* | 11/2020 | Kim ....................... H04W 72/04 |
| 2021/0152494 A1* | 5/2021 | Johnsen ................. H04L 47/30 |
| 2021/0168125 A1* | 6/2021 | Vemulpali ............. H04L 61/103 |
| 2021/0224224 A1* | 7/2021 | Wakabayashi ........ H04L 9/0643 |

OTHER PUBLICATIONS

Ali El Kamal et al. : "An Eficient MPLS-Based Source Routing Scheme in Software-Defined Wide Area Networks (SD-WAN)" 2017 IEE/ACS 14th International Conference on Computer Systems and Applications (AICCSA), IEEE, Oct. 30, 2017, ( 7 pages).
Notification of Transmittal of the International Search Report and the Written Opinion of the International Search Authority, or the Declaration issued in International Patent Application No. PCT/US2021/014569, dated May 12, 2021 (19 pages).

* cited by examiner

SWITCH AND BACKHAUL CAPACITY-BASED RADIO RESOURCE MANAGEMENT

TECHNICAL FIELD

An exemplary aspect is directed toward communications systems. More specifically an exemplary aspect is directed toward IEEE (Institute of Electrical and Electronics Engineers) 802.11 wireless communications systems.

BACKGROUND

Wireless systems employ processes to manage the radio resources of the wireless devices to optimize parameters including channelization, transmit power, etc. The management of the radio helps avoid or mitigate issues with signal interference, bandwidth contention, etc. Newer Wi-Fi standards allow for more bandwidth capacity for Wireless Local Area Network (WLAN). With wide channel bandwidths, e.g., up to 160 MHz, and very high data rates, higher throughput through the WLAN can be attained. However, usage of wide bandwidths contributes to high frequency reuse, which can cause more interference on at least some channels, among Basic Service Sets (BSSs) in a Radio Frequency (RF) neighborhood. Thus, The Access Points (APs) providing wireless access to the WLAN must carefully administer Radio Resource Management (RRM) to balance the higher bandwidth capacity and the increased interference potential (caused by overlapping spectrum) when selecting the higher bandwidths.

APs may rely on other communications technologies to connect to the rest of the network/Internet. One of the most common connections is an Ethernet switch, which may be directly connected to the AP. APs can also use other technologies as a backhaul, such as 5G networks or Data Over Cable Service Interface Specifications (DOCSIS). The realized capacity that the AP can provide to stations connected to the AP can be bottlenecked by the capacity of the switch and/or backhaul connection. For example, if the switch capacity is only 1 Gbps, then the stations connected to the AP cannot realize the full capacity of the 160 MHz bandwidth channels, which can support as much as 2.3 Gbps. Similarly, the 5G backhaul may have limited data rates, either from physical link capacity limits or from cellular service provider throttling the channel due to tiered plans.

With current RRM techniques, the switch and backhaul limits are not determined or allowed for in the bandwidth allocations, which can lead to excessively wide bandwidth selection, where APs and client stations cannot take advantage of the increased radio capacity, while also reducing the available wireless spectrum.

SUMMARY

Aspects herein can include systems and methods that analyze a bandwidth restriction in a communication stream of an Access Point (AP). Then, based on the bandwidth restriction, the AP can determine a lower amount of wireless bandwidth to provide to station wireless communicating to the AP. The AP can then modify a bandwidth allocation assigned to the station based on the lower amount of wireless bandwidth.

Figure 1:
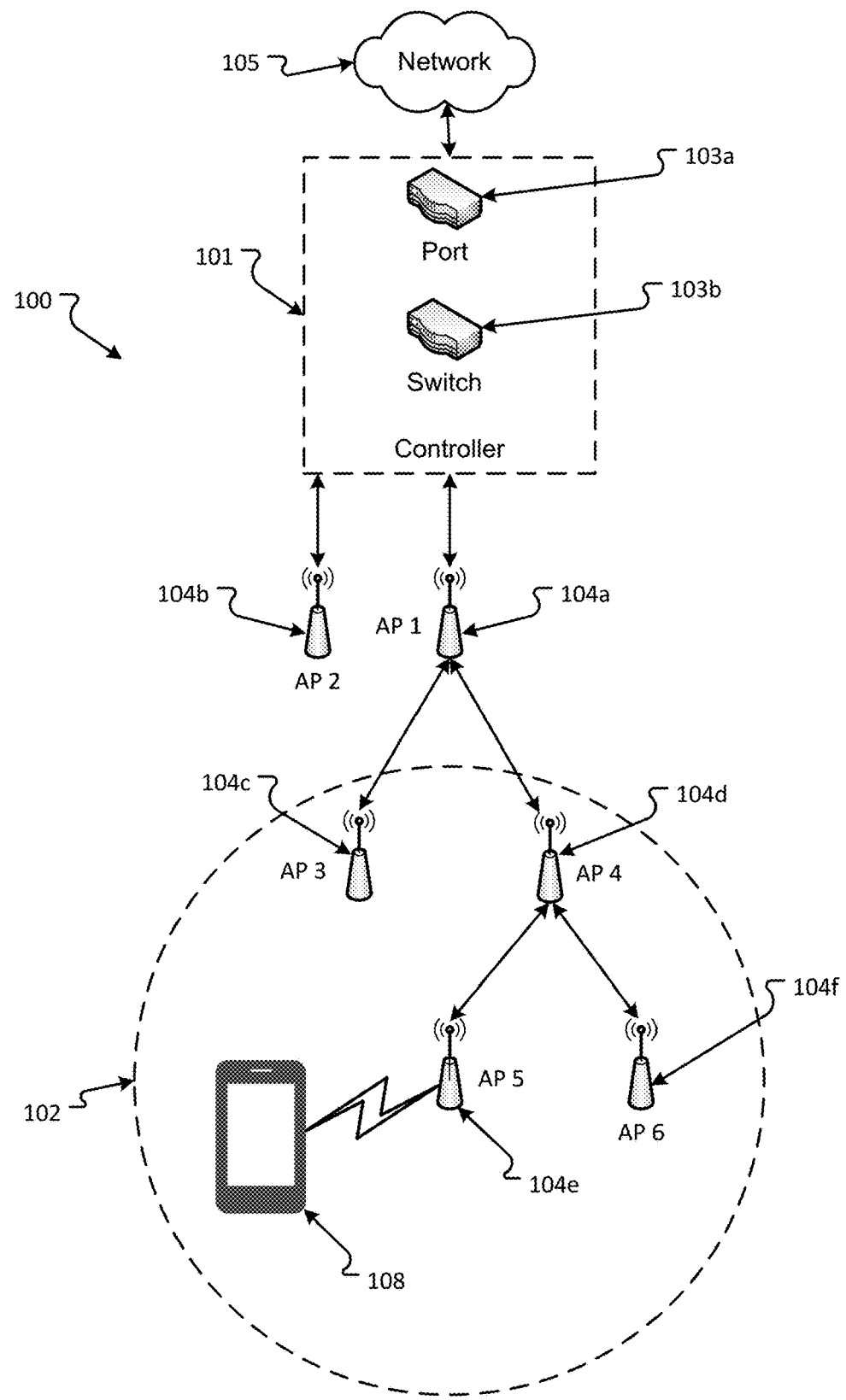
FIG. 1 illustrates an environment with a network in accordance with aspects of the current disclosure.

In the drawings, like numerals can refer to like components. A letter following the numeral indicates another instance of the same type of component. Like components can share the description of that component. When referring to a component without the letter following the numeral, all components having that numeral indicator may share that description.

DETAILED DESCRIPTION

Overview

Aspects herein include a method that optimizes a Wireless Radio's operational bandwidth, spatial stream, and frequency assignment(s) based on the backend infrastructure's capability(ies), current network state, and backhaul capacity. The method can combine knowledge about wired and wireless components, traffic inflows in varying topologies, etc. to determine whether the bandwidth assignment should be adjusted based on the underlying infrastructure nodes.

With the evolution of wireless radios, AP radios can handle Gigabit traffic streams from Very High Throughput (VHT) stations which makes wireless networks support high bandwidth applications and HD/4K Video streams. Some recently developed standards increases the link capacity and efficiency even further, where each spatial stream can handle 1.2 Gbps and generate a combined 9.6 Gbps of output by an AP capable of 8 Spatial Streams. With the adoption of the newer 802.11 standards, the backend switches, ports, and other network elements could now become bandwidth bottleneck.

The aspects herein can bias Radio Resource Management (RRM) bandwidth, adaptive Resource Unit (RU) Assignment, and Dynamic Spatial Stream adjustments based on switch and backhaul capacity limits to optimize for highest achievable radio capacity (i.e. data rate) and reduce co-channel interference induced by overlapping BSS (OBSS).

The Backhaul Aware Dynamic Frequency Adjustment (BADFA) in RRM takes following three infrastructure parameters into consideration. First, the BADFA considers the access switch capability. The access switch capability can include the port capability. Access switches can provides a first hop connection to the Wi-Fi AP and, therefore, switch capacity has a direct impact on the maximum data that can be pushed by AP's egress Ethernet port. Using a Level 2 (L2) discovery protocol, for example, CDP (Cisco Discovery Protocol) or LLDP (Link Layer Data Protocol), an AP can become aware about the maximum capacity of the connected switch. Additionally, a resource manager (e.g., WLAN Controller or the Network Management System (NMS)) can provide visibility into the AP's port capability and the port's current load. Furthermore, a wireless AP can support Link Aggregation (LAG). LAG allows the AP to combine multiple Ethernet links into a single logical link between two networked devices. Therefore, the total capacity of an egress port at AP can also consider LAG.

Switch port usage for non-Wi-Fi traffic can also be measured directly or averaged based on historical data. The non-Wi-Fi traffic switch port usage is subtracted from the maximum switch port capacity to yield the switch port capacity available for wireless or Wi-Fi traffic, which RRM takes into account for the bandwidth selection decisions.

Second the BADFA considers the switch profile: The network infrastructure, e.g., switch or NMS, can be queried to get information about the capacity and traffic utilization of the next hop link or links (to the rest of the network/Internet) of the switch to which the AP is connected. This next hop link bandwidth can also be considered.

Next, the BADFA can consider the egress capacity: Despite having an individual Gigabit port, a switch may not be able to handle their true capabilities if the egress port of the switch has limited bandwidth. For example, the switch is limited if, for example, ten APs are each connected to a 1 Gbps port on a switch that has one 5 Gbps link out to a router and, all traffic to and from the APs, needs to go through the one 5 Gbps link. If each AP is trying to push 1 Gbps up through the switch link to the router, the APs can be bottlenecked by the 5 Gbps link at the egress port.

Also, the BADFA can consider user policy. Neighboring APs may be on different switches (e.g. due to high availability (HA)), meaning the other APs may have different switch capacities and utilizations. Thus, if one channel width is reduced on one AP, that same channel may have freed spectrum that can be utilized to increase bandwidth for another AP on a different switch that allows for the increased capacity. Similarly, by leveraging a Software-Defined Wide Area Network (SD-WAN), a user may configure a dynamic switch policy, which can allow varying access rates per switch/ports around peak time as compared to after-hours times.

The BADFA can consider a next hop link capacity and the average utilization of that next hop link, along with the average load that each AP requests and pushes. The RRM can select appropriate bandwidths for the APs based on the next hop link capacities. For example, in a heavily loaded network, assigning 80 MHz channels to 5 APs connected to a switch with a 1 Gbps next hop link is non-productive because the next hop link cannot utilize the high data rates achievable with 80 MHz, and the spectrum would be better used by other APs connected to backend infrastructure that could handle higher bandwidths.

The wireless AP can be connected to back-end infrastructure via Wired DOCSIS interfaces, for example, Ethernet, Coaxial Cable, Hybrid Fiber Coaxial (HFC), etc. or via wireless infrastructure, for example, Cellular, 5G technologies, etc. With these technologies, user policy and/or external factors can cause variation in the available bandwidth. For example, high interference can severely reduce backend infrastructure capability to handle inbound Gigabits of a traffic stream from the APs. Therefore, the aspects can consider such infrastructure capacity and usage to gauge available bandwidth for the AP.

The backhaul capacity can be limited by either physical link limits (as explained above) or by a service provider throttling due to tiered plans and policies. When the backend infrastructure's bandwidth is reduced, the aspects herein can enforce following adjustments on the Wi-Fi AP to make wireless communications with stations more robust.

The aspects can also limit or change functions of the AP or other network elements to allow for the most wireless bandwidth. For example, the system can suppress higher Modulation and Coding Scheme (MCS) traffic: When backend infrastructure cannot handle high-bandwidth wireless traffic, to make reliable communication between AP and the stations, the aspects can cap or limit Downlink (DL) to lower MCS rates. While this will reduce overall bandwidth consumption, it will also reduce 802.11 overhead by reducing RTS/CTS and Retries at higher rates.

Further, the aspects can throttle Trigger Frames (TFs). For at least some stations, an AP can throttle Uplink (UL) transmissions from STAs by throttling the number of TFs. Trigger frames allow Access Points to control traffic streams from their associated stations. By throttling trigger frames, the amount of uplink traffic will be reduced/distributed, and thus, result in lower bandwidth usage.

The aspects may also adjust robust contention backoff. The contention backoff parameters can be adjusted to have increased Contention Window Minimum ($CW_{min}$) and Contention Window Maximum ($CW_{max}$) to allow reliable message exchange, over a reduced backend infrastructure. Also, the aspects can reduce spatial streams. Spatial streams are radio chains that carry unique set of data to one or many stations. Total capacity of the radio is determined by each SS's capacity multiplied by total number of spatial streams supported. When backend capacity is reduced, a wireless radio can reduce the number of spatial streams supported to further reduce overall bandwidth consumption. Reducing spatial streams also reduces total power usage by wireless APs. Permutations and combinations of aforementioned adjustments can be made based on the variations seen across wireless deployments.

Finally, some network deployments include mesh networks where two or more APs join in a wireless network. A mesh network offers flexible RF topology that need not have dependencies on the Ethernet switch ports. A Root Access Point (RAP) can be connected to a backend access switch, and multi-hop Child Mesh APs (CMAP) can be connected to the RAP, via a mesh backhaul and over the Wi-Fi. As a number of hops increases, latency in the wireless communication increases and therefore overall capacity of the CMAP decreases. Therefore, mesh topology-aware RF optimizations would include optimizations.

First, method can support incremental bandwidth adjustments based on a number of mesh hops. For example, if the mesh backhaul between the RAP and the CMAP operates at 80 MHz Channel width, all subsequent child MAPs can only support a 40 MHz or below channel width.

The mesh supports a unique tree-like topology where data traffic from stations associated to CMAPs can be bridged without querying backend infrastructure. The aspects can perform traffic inflow analysis within mesh topology, and, if a significant amount of traffic is exchanged within mesh sub-tree (traffic streams do not route to backend infrastructure), then the aspects can assign robust and wider channel bandwidth to subtree segments while reducing backend dependent mesh nodes to reduced bandwidth.

Then, the traffic steams can be further analyzed to create a stack ranking within the mesh nodes based on the stream inflow. For example, mesh nodes, with the highest amount of stream inflow, can be assigned the best frequencies, with widest possible bandwidth. Similarly, leaf mesh nodes, with least amount of traffic inflow, can be assigned the lowest bandwidth.

Aspects herein are generally directed to wireless communications systems that can perform according to one or more wireless communications standards. For example, some aspects may involve wireless communications performed according to Wi-Fi standards developed by the IEEE 802.11, for example, may involve wireless communications performed in accordance with IEEE 802.11ax. Some aspects may involve wireless communications performed in accordance with other standards, rules, regulations, guidance, etc. Some aspects may additionally or alternatively involve wireless communications according to one or more other wireless communication standards, for example, and without limitation, other IEEE wireless communication standards, such as the IEEE 802.11, IEEE 802.11a, IEEE 802.11b, IEEE 802.11g, IEEE 802.11n, IEEE 802.11u, IEEE 802.11ac, IEEE 802.11ad, IEEE 802.11af, IEEE 802.11 ah, and/or IEEE 802.11ay standards, Wi-Fi Alliance (WFA) wireless communication standards, such as, Wi-Fi, Wi-Fi Direct, Wi-Fi Direct Services, Wireless Gigabit (WiGig), WiGig Display Extension (WDE), WiGig Bus Extension (WBE), WiGig Serial Extension (WSE) standards and/or standards developed by the WFA Neighbor Awareness Networking (NAN) Task Group, Machine-Type Communications (MTC) standards such as those embodied in 3GPP Technical Report (TR) 23.887, 3GPP Technical Specification (TS) 22.368, and/or 3GPP TS 23.682, and/or Near-Field Communication (NFC) standards such as standards developed by the NFC Forum, including any predecessors, revisions, progeny, and/or variants of any of the above.

Likewise, some aspects may involve wireless communications performed according to one or more broadband wireless communication standards, for example, 3rd Generation Partnership Project (3GPP), 3GPP Long Term Evolution (LTE), and/or 3GPP LTE-Advanced (LTE-A) technologies and/or standards. Additional examples of broadband wireless communication technologies/standards may include Global System for Mobile Communications (GSM)/Enhanced Data Rates for GSM Evolution (EDGE), Universal Mobile Telecommunications System (UMTS)/ High Speed Packet Access (HSPA), and/or GSM with General Packet Radio Service (GPRS) system (GSM/GPRS), IEEE 802.16 wireless broadband standards such as IEEE 802.16m and/or IEEE 802.16p, International Mobile Telecommunications Advanced (IMT-ADV), Worldwide Interoperability for Microwave Access (WiMAX) and/or WiMAX II, Code Division Multiple Access (CDMA) 2000 (e.g., CDMA2000 1.times.RTT, CDMA2000 EV-DO, CDMA EV-DV, and so forth), High Performance Radio Metropolitan Area Network (HIPERMAN), Wireless Broadband (WiBro), High Speed Downlink Packet Access (HSDPA), High Speed Orthogonal Frequency-Division Multiplexing (OFDM) Packet Access (HSOPA), High-Speed Uplink Packet Access (HSUPA) technologies and/or standards.

EXAMPLE EMBODIMENTS

FIG. 1 illustrates an example of an operating environment 100 associated with aspects herein. The WLAN in environment 100 may comprise an Extended Service Set (ESS), which can include a master station or controller 101, one or more APs 104a-104f, one or more basic service sets (BSSs) 102, which may include, an AP 5 104e and one or more devices or stations (STAs) 108. The master station 101 may be an AP using the IEEE 802.11 protocol(s) to transmit and receive.

Figure 8:
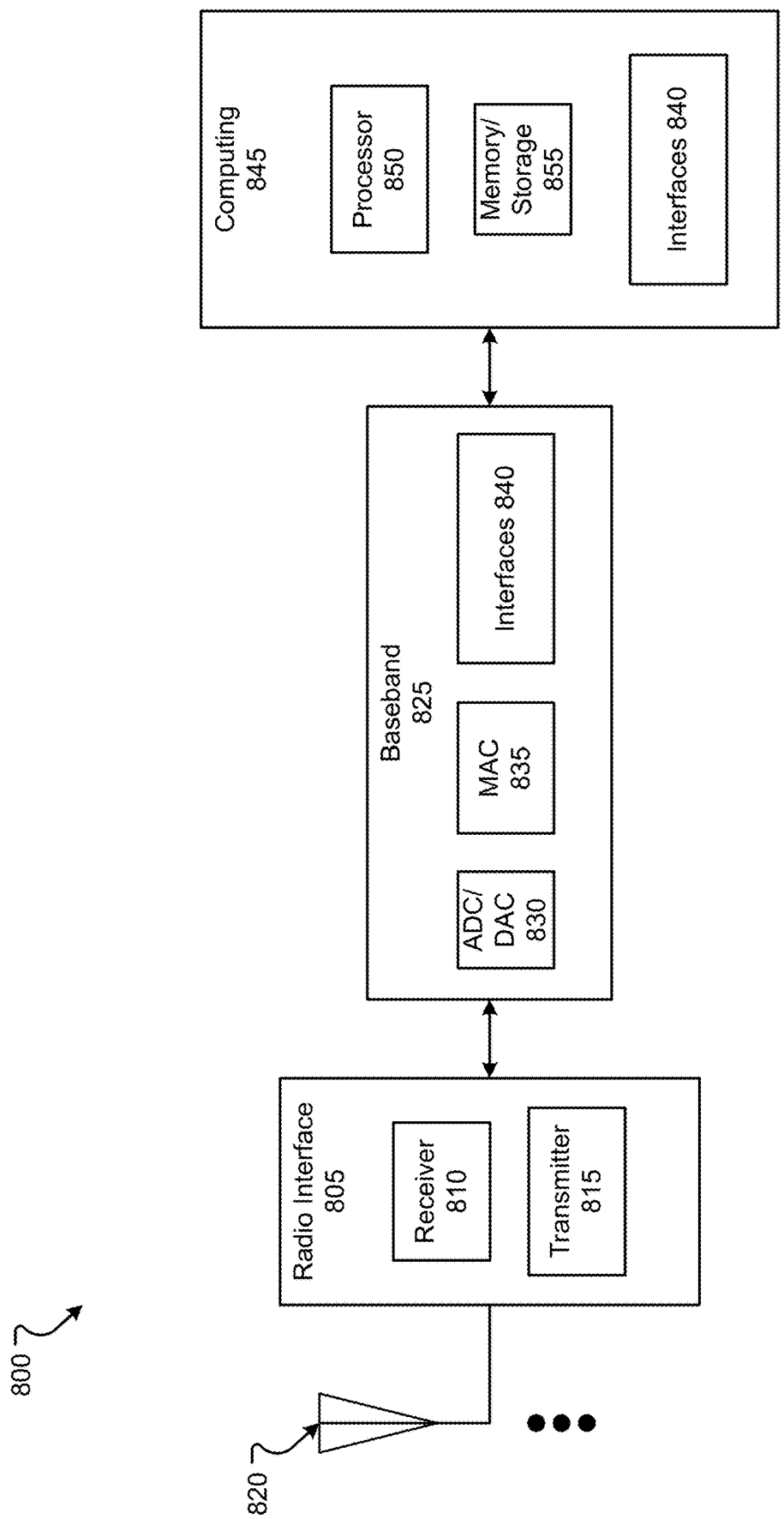
FIG. 8 illustrates an embodiment of a station or access point in accordance with aspects of the current disclosure.

The AP 104 may be a base station and may use other communications protocols as well as the IEEE 802.11 protocol. The IEEE 802.11 protocol may include using OFDMA, Time Division Multiple Access (TDMA), and/or code division multiple access (CDMA). The IEEE 802.11 protocol may include a multiple access technique. For example, the IEEE 802.11 protocol may include Space-Division Multiple Access (SDMA) and/or Multiple-User Multiple-Input Multiple-Output (MU-MIMO). An example configuration of the APs 104 and/or controllers 101 may be as shown in FIG. 8.

The STAs 108 may include one or more High-Efficiency Wireless (HEW) (as illustrated in, e.g., the IEEE 802.11ax standard) STAs, future defined types of STAs, and/or one or more legacy (as illustrated in, e.g., the IEEE 802.11n/ac standards) STAs. The STAs 108 may be wireless devices, for example, a cellular telephone, a smart telephone, a handheld wireless device, wireless glasses, a wireless watch, a wireless personal device, a tablet, or another device that may be transmitting and receiving using an IEEE 802.11 protocol. In the operating environment, an AP 104 may generally manage access to the wireless medium in the WLAN in environment 100 for the STA 108.

Within the environment 100, one or more STAs 108 may associate and/or communicate with the AP 104 to join the WLAN. Joining the WLAN may enable STAs 108 to wirelessly communicate with each other via AP 104, with each other directly, with the AP 104, or to another network or resource through the AP 104. In some configurations, to send data to a recipient, a sending STA may transmit an Uplink (UL) Physical Layer Convergence Procedure (PLCP) Protocol Data Unit (PPDU) comprising the data, to AP 104, which may then send the data to the recipient STA 108, in a Downlink (DL) PPDU. The PLCP is the physical layer protocol that is used with 802.11 and other standards.

In some configurations, a frame of data transmitted between the STAs 108 or between a STA 108 and the AP 104 may be configurable. For example, a channel used for communication may be divided into subchannels that may be 20 MHz, 40 MHz, or 80 MHz, 160 MHz, of contiguous bandwidth or an 80+80 MHz (160 MHz) of non-contiguous bandwidth. Further, the bandwidth of a subchannel may be incremented into 1 MHz, 1.25 MHz, 2.03 MHz, 2.5 MHz, 5 MHz 10 MHz bandwidths, a combination thereof, or any other bandwidth division that is less or equal to the available bandwidth may also be used. The bandwidth of the subchannels may be based on a number of active subcarriers.

The bandwidth of the subchannels can be multiples of 26 (e.g., 26, 52, 104, etc.) active subcarriers or tones that are spaced by 20 MHz. In some configurations, the bandwidth of the subchannels is 256 tones spaced by 20 MHz. In other configurations, the subchannels are a multiple of 26 tones or a multiple of 20 MHz. A 20 MHz subchannel may also comprise 256 tones for use with a 256 point Fast Fourier Transform (FFT); however, other combinations are possible and using 256 tones in a 20 MHz subchannel is not necessary to execute the methods herein.

When managing access to the wireless medium in the WLAN in environment 100, the AP 104 may schedule medium access, for the sending STA 108, during a UL time interval, during which the AP 104 may refrain from transmitting over the wireless medium. The UL time interval may comprise a portion of a Transmit Opportunity (TXOP) owned by AP 104.

At a given point in time, multiple STAs, in the WLAN, may wish to send data. In some configurations, rather than scheduling medium access for STAs 108 in different respective UL time intervals, the AP 104 may schedule medium access for STAs 108 to support UL MU transmission techniques, according to which multiple STAs 108 may transmit UL MU PPDUs to the AP 104 simultaneously during a given UL time interval. For example, by using UL MU OFDMA techniques during a given UL time interval, multiple STAs 108 may transmit UL MU PPDUs to the AP 104 via different respective OFDMA Resource Units (RUs) allocated by the AP 104. In another example, by using UL MU-MIMO techniques during a given UL time interval, multiple STAs 108 may transmit UL MU PPDUs to the AP 104 via different respective spatial streams allocated by the AP 104.

To manage access, the AP 104 may transmit a master-sync transmission, which may be a Trigger Frame (TF) or a control and schedule transmission, at the beginning of the control period. The AP 104 may transmit a time duration of the TXOP and sub-channel information. During the control period, STAs 108 may communicate with the AP 104 in accordance with a non-contention based multiple access technique, such as OFDMA or MU-MIMO. This technique is unlike conventional WLAN communications in which devices communicate in accordance with a contention-based communication technique, rather than a multiple access technique. During the control period, the AP 104 may communicate with STAs 108 using one or more control frames, and the STAs 108 may operate on a sub-channel smaller than the operating range of the AP 104.

During the master-sync transmission, the STAs 108 may contend for the wireless medium with the legacy STAs 108 being excluded from contending for the wireless medium during the master-sync transmission. The TF used during this master-sync transmission may indicate an UL-MU-MIMO and/or UL OFDMA control period. The multiple-access technique used during the control period may be a scheduled OFDMA technique, or alternatively, may be a TDMA technique, a Frequency Division Multiple Access (FDMA) technique, or a SDMA technique.

Similarly, STAs, in the WLAN, may need to receive data. Again, rather than scheduling medium access for STAs 108 in different respective DL time intervals, the AP 104 may schedule medium access for STAs 108 to support DL MU transmission techniques, according to which multiple STAs 108 may receive DL MU PPDUs from the AP 104 simultaneously during a given DL time interval. For example, by using DL MU OFDMA techniques during a given UL time interval, multiple STAs 108 may receive DL MU PPDUs from the AP 104 via different respective OFDMA RUs allocated by the AP 104. In another example, by using DL MU-MIMO techniques during a given DL time interval, multiple STAs 108 may receive DL MU PPDUs from the AP 104 via different respective spatial streams allocated by the AP 104.

To manage access, the AP 104 may transmit a master-sync transmission, which may be a TF or a control and schedule reception, at the beginning of the control period. The AP 104 may transmit a time duration of the Receive Opportunity (RXOP) and sub-channel information. During the control period, STAs 108 may communicate with the AP 104 in accordance with a non-contention based multiple access technique, such as OFDMA or MU-MIMO. During the control period, the AP 104 may communicate with STAs 108 using one or more control frames, and the STAs 108 may operate on a sub-channel smaller than the operating range of the AP 104.

During the master-sync transmission, the STAs 108 may contend for the wireless medium with the legacy STAs 108 being excluded from contending for the wireless medium during the master-sync transmission. The TF used during this master-sync transmission may indicate an UL-MU-MIMO and/or UL OFDMA control period. The multiple-access technique used during the control period may be a scheduled OFDMA technique, or alternatively, may be a TDMA technique, FDMA technique, or a SDMA technique.

The AP 104 may also communicate with legacy stations and/or STAs 108 in accordance with legacy IEEE 802.11 communication techniques. In some configurations, the AP 104 may also be configurable to communicate with STAs 108 outside the control period in accordance with legacy IEEE 802.11 communication techniques, although this is not a requirement.

The environment 100 may include a controller 101 that can include an egress port 103*a* and/or a switch 103*b*. Both the port 103*a* and switch 103*b* may be part of a same component or may be separate components where the controller 101 represents physically distinct devices. The port 103*a* and switch 103*b* may be embodied in hardware, software, or hardware and software. The port 103*a* and switch 103*b* can provide connections to the one or more APs 104 and to a network 105. The network 105 may be separated from or may be physically distinct from the network contained in environment 100.

One or more APs 104 may be connected to the controller 101. For example, two separate APs, AP1 104*a* and AP2 104*b*, may be wired or wirelessly communicating with the controller 101 for access to the external network 105. The APs 104 can be hardware, software, or a combination of hardware and software. APs may be as described in conjunction with FIG. 8.

APs 104 may be referred to a nodes, and, as such, the reference numeral 104 may reference APs and nodes. AP1 104*a* may be a top level node, a RAP, in a mesh network. A mesh network may include child node AP3 104*c* and AP4 104*d*. Each of those child nodes 104*c*, 104*d* may have further child nodes, for example, AP4 104*d* is in communication with child node AP5 104*e* and child node AP6 104*f*. There may be more or fewer APs 104 connected to the mesh network that those shown in FIG. 1 and may be arranged differently than that shown in FIG. 1. One or more APs 104 within the environment 100 may be in communication with the STA 108.

The STA 108 can be any hardware, software, combination of hardware and software providing client access to the BSS 102 and, through the BSS 102, to the external network 105.

The STA 108 can be in wireless communication with an AP 104c. The STA 108 may be as described in conjunction with FIG. 8.

Figure 2:
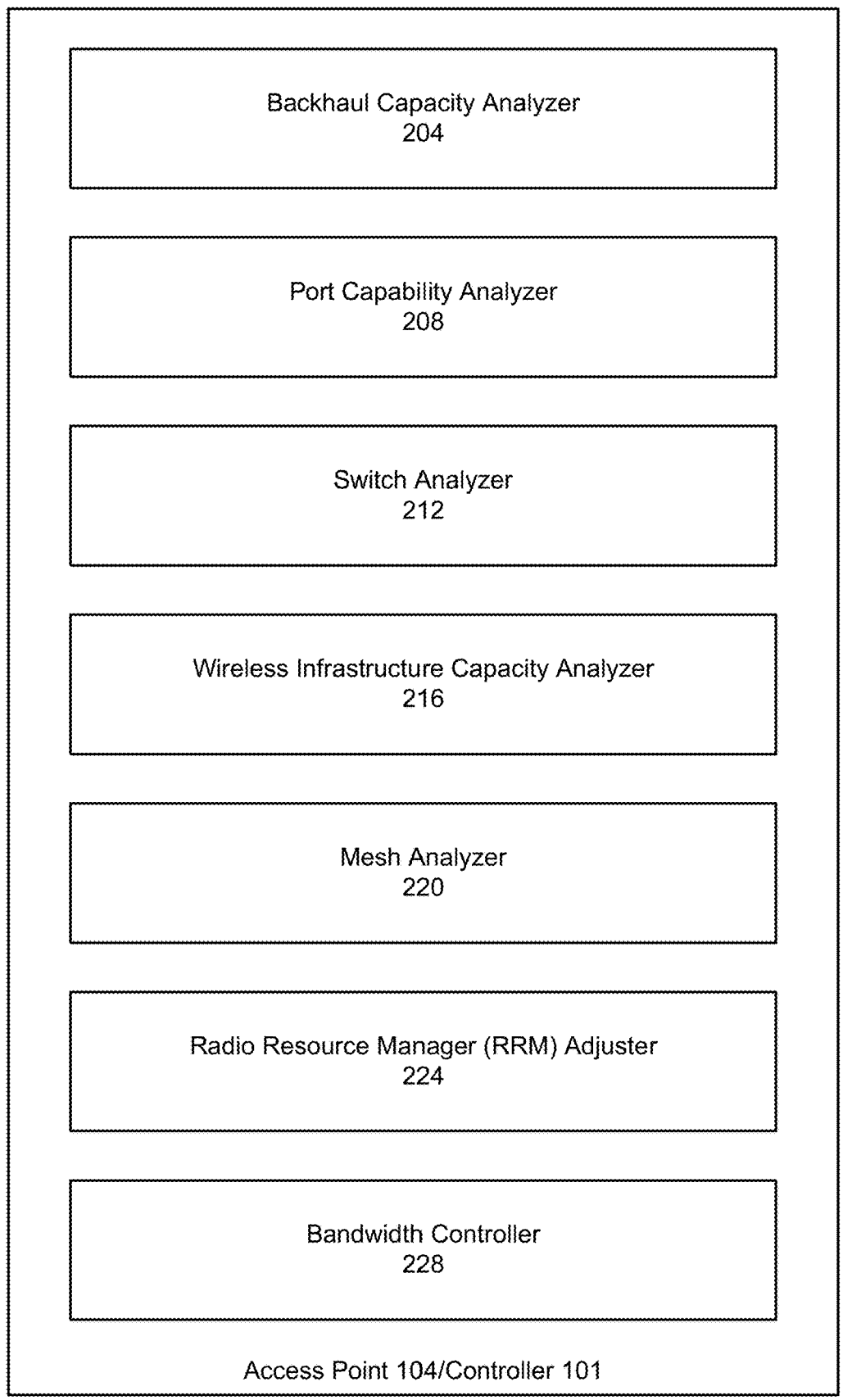
FIG. 2 illustrates an access point or controller in accordance with aspects of the current disclosure.

An embodiment of hardware and/or software that may comprise components of the AP 104 and/or the controller 101 may be as shown in FIG. 2. These components can include one of more of, but is not limited to, a backhaul capacity analyzer 204, a port capability analyzer 208, a switch analyzer 212, a wireless infrastructure capacity analyzer 216, a mesh analyzer 220, a radio resource management (RRM) bandwidth adjuster 224, and a bandwidth controller 228.

The backhaul capacity analyzer 204 can analyze the bandwidth or other capabilities of the connection between the controller 101 and the backend network 105. Thus, the egress connection from the BSS 102 and/or the environment 100 to the network 105 can be analyzed to determine the amount of available bandwidth or other types of restraints or conditions. Backhaul capacity analyzer 204 then presents the total amount of outgoing bandwidth available to the environment 100 to the RRM bandwidth adjuster 224. The information determined by the backhaul capacity analyzer 204 may be as described in conjunction with FIG. 4A and/or FIG. 4B.

The port capability analyzer 208 can analyze the ability of the port 103 for bandwidth and other restrictions. A port capability analyzer 208 can determine the amount of incoming bandwidth and outgoing bandwidth from the port 103 and any type of restrictions on bandwidth capacity through the port 103a or processing restrictions that may limit the amount of data being sent through the port 103a. Similarly, the switch analyzer 212 can analyze the switch 103b for bandwidth capacity. Thus, the switch analyzer 212 can also determine the incoming bandwidth capabilities, outgoing capabilities, and any restrictions on the processing of data throughput through the switch 103b. The data from the port capability analyzer 208 and switch analyzer 212 may also be sent to the RRM bandwidth adjuster 224. The information determined by the port capability analyzer 208 may be as described in conjunction with FIG. 4A and/or FIG. 4B.

The wireless infrastructure capacity analyzer 216 can analyze any restrictions that may occur on wireless links either from an AP 104 to the controller 101, between APs 104 and STAs 108, or any other type of restriction on the capacity of the wireless environment 100. In this way, the wireless infrastructure capacity analyzer 216 can determine if there are any kind of restrictions or bandwidth limiters that may need to be taken into account by the RRM bandwidth adjuster 224. The information determined by the wireless infrastructure capacity analyzer 216 may be as described in conjunction with FIG. 4A and/or FIG. 4B.

Mesh analyzer 220 can analyze the AP meshes shown from 104a to 104f. This mesh analyzer 220 can determine bandwidth capacities between nodes or amongst the entire mesh network. This information about the mesh network may be provided to the RRM bandwidth adjuster 224. The information determined by the mesh analyzer 220 may be as described in conjunction with FIG. 4C.

The RRM bandwidth adjuster 224 is capable of determining limitations on any AP 104 within the environment 100 based on bandwidth information, at another STA 108, or over a link connected to or causing a restriction on the AP's capacity. Thus, the RRM bandwidth adjuster 224 can determine the max amount of bandwidth than can be used by the AP 104 based on the AP's situation in the network in environment 100 or with one of the components, for example, the switch 103b, the port 103a, or other components or connections limiting the amount of bandwidth that could be sent to or from the AP 104. This information may then be sent to the bandwidth controller 228.

The bandwidth controller 228 functions to change the amount of wireless spectrum provided to the AP 104 based on the restrictions provided by the RRM bandwidth adjuster 224. Thus, if the AP 104a, for example, is unable to send more than a particular amount of bandwidth through to the network 105 based on the restrictions of the switch 103b, the port 103a, the network 105 connection, or other devices or connections, the bandwidth controller 228 can limit the AP's 104a wireless capacity to STAs 108 or other APs 104 based on these restrictions. In this way, the wireless spectrum that may have been allotted to the AP 104a, but not able to be used by AP 104b can then be reassigned or allocated to other APs 104 that do not have the same type of restrictions or may require additional wireless bandwidth.

Figure 3:
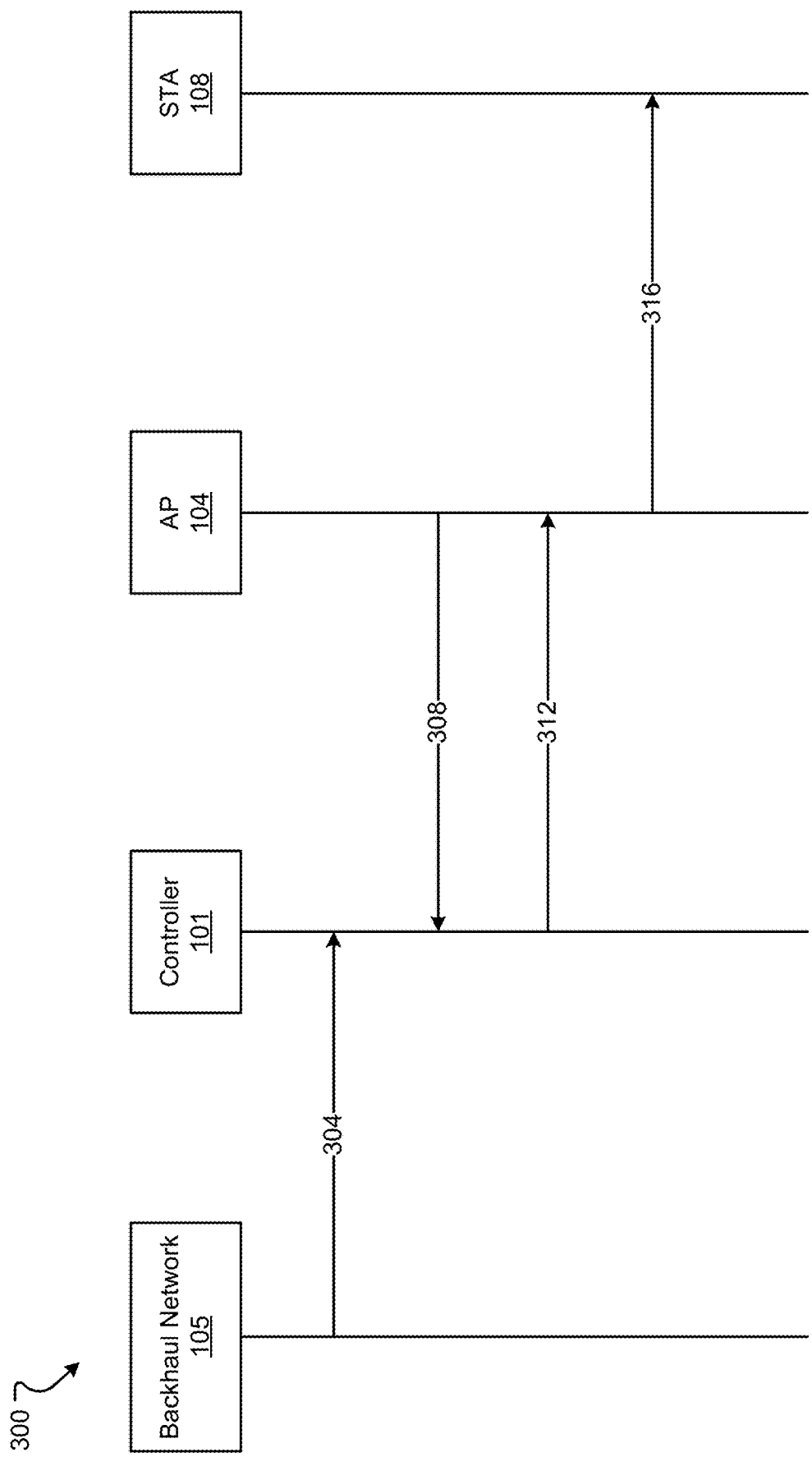
FIG. 3 illustrates a signaling process in accordance with aspects of the current disclosure.

An embodiment of a signaling process 300 conducted by components of the environment 100 may be as shown in FIG. 3. The backhaul, which may be represented by the network 105, may be in communication with the controller 101, which may be in communication with one or more APs 104, which, in turn, may be in communication with one or more STAs 108.

In the signaling process, the backhaul network 105 may send a message or information to the controller 101, in signal 304. Further, the AP 104 may send one or more items of information to the controller, in signal 308. The signal 304 and 308 may provide information about the bandwidth capacities both upstream of the controller 101 and upstream or downstream of the AP 104. This information may then provide for a determined amount of bandwidth available to use by each AP 104 based on its restrictions that are based on devices or links connected to the AP 104 or within the AP's signaling tree.

This information may then be used to determine amount of capacity provided to or allotted to the AP 104. This allotted wireless capacity may be sent in signal 312 to the AP 104 for limiting the amount of wireless spectrum the AP 104 may use. The AP 104 may then use that allotted spectrum to communication with a STA 108 in signal(s) 316. In this way, the AP 104 may have its wireless spectrum adjusted or correlated to the lowest amount of capacity or capability the AP 104 can use based on the connections and devices connected upstream and downstream from the AP 104.

Figure 4A:
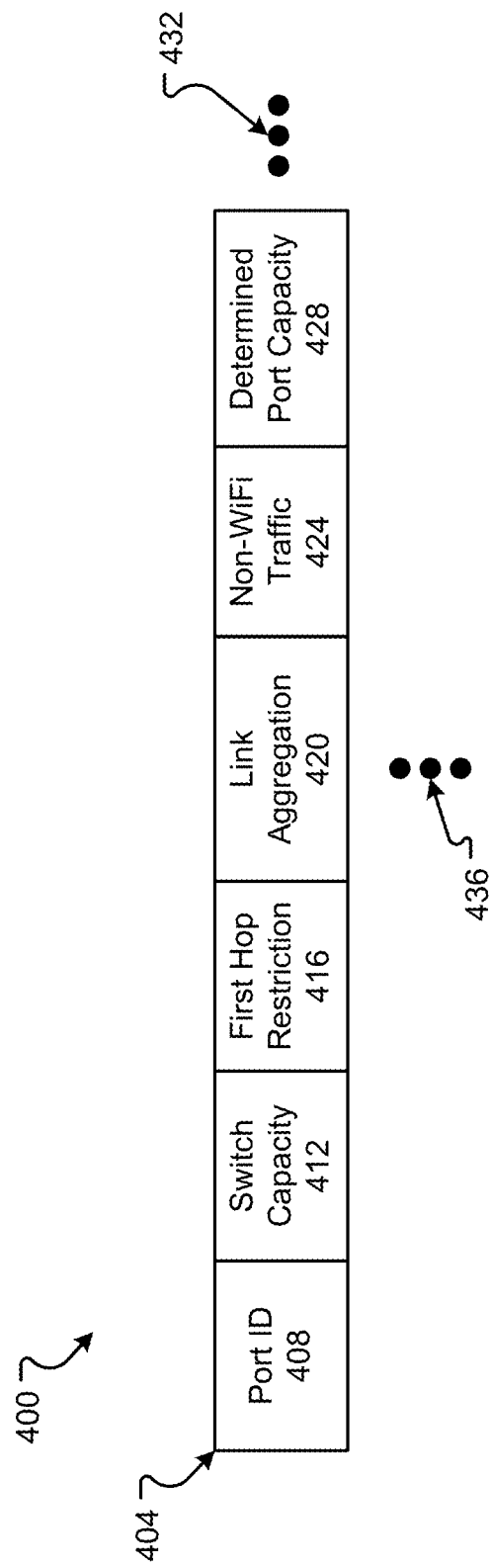
FIG. 4A illustrates data structure that may be received, stored, retrieved, managed, etc., in accordance with aspects of the current disclosure.
Figure 4B:
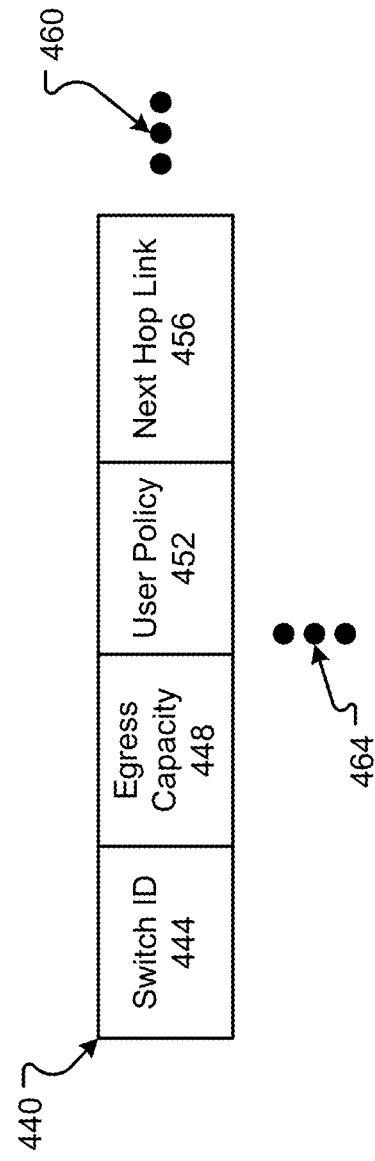
FIG. 4B illustrates another data structure that may be received, stored, retrieved, managed, etc., in accordance with aspects of the current disclosure.
Figure 4C:
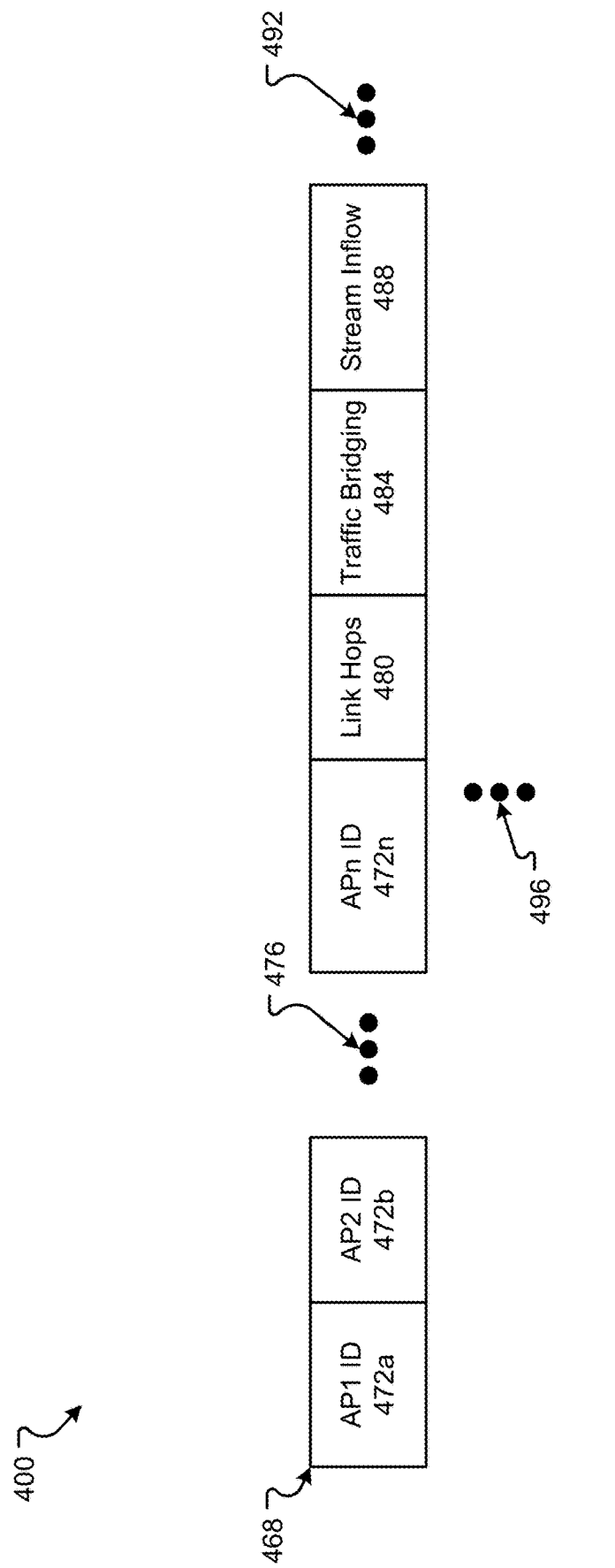
FIG. 4C illustrates another data structure that may be received, stored, retrieved, managed, etc., in accordance with aspects of the current disclosure.

A data store 400 comprising one or more data structures that may be sent, received, stored, retrieved or managed within the system in environment 100 may be as shown in FIGS. 4A through 4C. There may be more data structures, in data store 400 or provided within the environment 100 and communicated in the several process used to provide wireless capability to the STAs 108, than those shown here in FIGS. 4A through 4C.

A first data structure 404, which is shown in FIG. 4A, may represent data about one or more ports 103a. The data structure 404 can include a port identifier (PID) 408, switch capacity 412, first hop restrictions 416, Link Aggregation (LAG) data 420, known Wi-Fi traffic information 424, and/or determined port capacity 428. There may be more or fewer fields in data structure 404, as represented by ellipses 432. Each port 103 within the system may include a different data structure 404 as represented by ellipses 436.

The PID 408 can be any type of identifier that uniquely identifies the port 103a. This PID 408 can be a numeric ID, an alphanumeric ID, a Globally Unique ID (GUID), or other type of ID. In some situations, the PID 408 is the MAC address or other communication address for the port 103a.

Regardless of the ID type, the PID 408 uniquely identifies the port 103a to other ports 103a in or outside the environment 100.

Switch capacity 412 can represent the amount of capacity that can be provided by the switch within the port 103a or switches that may be connected to the port 103a. The switch capacity 412 may represent a total bandwidth available for sending to the network 105 or for accepting information from the network 105. The switch capacity 412 can be represented as the bandwidth in bits per second or other measure.

The first hop restriction 416 can determine and record the amount of capacity of the connection from the port 103a to the network 105. This first hop restriction 416 can be listed as an amount of bandwidth available and may be deduced by averaging the amount of bandwidth being used over a period of time or by other methods.

LAG data 420 can include an aggregated amount of data being used by the several wireless or wired data streams being received or sent by the port 103a. Thus, the port 103a can determine a total amount of data bandwidth being used based on aggregating all of the bandwidth of the various separate connections or streams coming into the port 103a from a switch 103b or APs 104. Similarly, the outgoing data links may be analyzed to determine aggregated amount of data being used. LAG data 420 can use logical links and/or physical links to determine the aggregation. LAG data 420 can be represented by a total bandwidth being received by or sent by the port 103a.

Non-Wi-Fi traffic information 424 can include any type of bandwidth being used by housekeeping or other control features that may not be part of the data traffic. This non-Wi-Fi traffic 424 may also be referred to as 802.11 overhead traffic. These non-Wi-Fi types of transmissions can be made to control or establish the interface between different switches 103b, APs 104, or other devices in network 105. This non-Wi-Fi traffic may also be determined at a point in time, by averaging bandwidth used, or by other type of measure. The non-Wi-Fi traffic information 424 can include a bandwidth measurement.

The determined port capacity 428 can be the amount of available bandwidth that can be provided by the port 103a. The determined port capacity 428 is generally determined by the difference of the switch capacity 412 minus the non-Wi-Fi traffic information 424. In other situations, the determine port capacity 428 may be calculated as the product of switch capacity 412 multiplied by a capacity allowed by a Software Defined-WAN (SD-WAN) policy, enforced by a user. The SD-WAN policy is an amount of bandwidth allowed by a user. For example, the SD-WAN policy can be set to 75% of total capacity. In this way, the determined port capacity 428 can determine if there is more data being sent based on the amount of bandwidth being used in LAG data 420 compared to the determined port capacity 428 explained above. If there is not enough determined port capacity 428, then the port 103a can alert the APs 104 or control the bandwidth being used by the different APs 104 to ensure that that amount of data is within the amount of determined port capacity 428.

A data structure 440 which may represent information about a switch 103b may be as shown in FIG. 4B. The data structure 440 can include one or more of, but is not limited to, a switch ID 444, egress capacity 448, user policies 452, and next hop link data 456. There may be more or fewer fields within data structure 440, as represented by ellipses 460. Further, each switch within the system may have a separate data structure 440, as represented by ellipses 464.

The switch ID 444 can be any type of ID including a numeric ID, alphanumeric ID, a GUID, a MAC address, a URL, etc. The switch ID 444 uniquely identifies the switch 103b amongst other switches in the environment 100 or other components within the environment 100.

The egress capacity 448 can be the amount of capacity or bandwidth between the switch 103b and port 103a. The egress capacity 448 can be limited by the port 103a or by other components beyond the port 103a. This egress capacity 448 can be recorded as an amount of bandwidth available to send from the switch 103b. Egress capacity can be calculated by first determine the product of the Ethernet port capacity, of the AP, multiplied by the Link Aggregation data and then subtracting the amount of 802.11 Management traffic overhead.

User policies 452 may be any type of policies for sharing spectrum or bandwidth amongst switches 103b in the environment 100 or amongst other BSSs that may be neighboring the BSS 102 and sharing the same spectrum. Thus, the user policies 452 can assign or request that, in certain situations, the switch 103b should move bandwidth to another BSS or switch 103b. These policies 452 may be used to determine if the bandwidth to the APs 104 should be limited in some situations.

The next hop link data 456 can be the bandwidth capacity of any type of link from a switch 103b to the port 103a or from the switch 103b to the network 105, etc. This next hop link data 456 may be similar to data associated with the first hop restriction 416. The next hop link data 456 can be recorded as a bandwidth or other restrictions.

Another data structure 468 may be as shown in FIG. 4C. Data structure 468 may be related to any type of data about mesh networks within the environment 100. Thus, the data structure 468 can include one or more AP IDs 472a through 472n, information about link hops 480, information about traffic bridging 484, and/or information about stream inflow bandwidth 488. There may be more or fewer fields than that shown in FIG. 4C, as represented by ellipses 492. There may be more than one mesh network within environment 100, which may each have their own separate data structure 468, as represented by ellipses 496.

The AP1 ID 472a, AP2 ID 472b, APn ID 472n can each be any type of ID including a numeric ID, an alphanumeric ID, a GUID, a MAC address, a URL, or other type of address or ID. The AP ID 472 is unique to each AP 104 and thus must identify that AP 104 uniquely within the mesh network or within the environment 100. There may be one or more AP IDs within the mesh network as represented by ellipses 476.

Link hop information 480 can describe the number of links or hops within the mesh network. Each of the links may have a separate amount of bandwidth required. Thus, links higher up in the mesh network may require more bandwidth to handle the capacity or communications capabilities outbound from APs 104 lower in the mesh network. This information about bandwidth requirements and link hops may be stored within data field 480.

Traffic bridging 484 can include a description of the amount of traffic within a mesh sub tree that may be determined through inflow analysis. There may be several members of the mesh network that are not associated to the backend structure. As such, these nodes may not provide information and may not be known to the controller/processor using the information. The inflow analysis can determine the amount of bandwidth required based on evaluating the amount of traffic being exchanged between mesh nodes and can determine the amount of network bandwidth being provided by the back independent mesh nodes. This information may be described as one or more bandwidths within the traffic bridging data field 484.

Stream inflow bandwidth 488 may be an analysis or ranking of the mesh nodes based on the amount of stream inflow being used; thus, mesh nodes with the highest amount of stream inflow can be provided the best frequencies or bandwidth for providing access to APs 104 or STAs 108. Thus, this stream inflow bandwidth 488 provides a hierarchal order of which nodes may need the most bandwidth within the mesh network. It is possible in the mesh network to have a first node with a higher bandwidth requirement than one or more nodes higher in the mesh tree, such as that first node's parent node. This situation occurs when there is a great amount of inter-nodal communication between the first node and/or one or more nodes in the sub-tree including or below the first node. Thus, a node or nodes in the sub-tree may be allotted more bandwidth than those nodes above the sub-tree.

Figure 5:
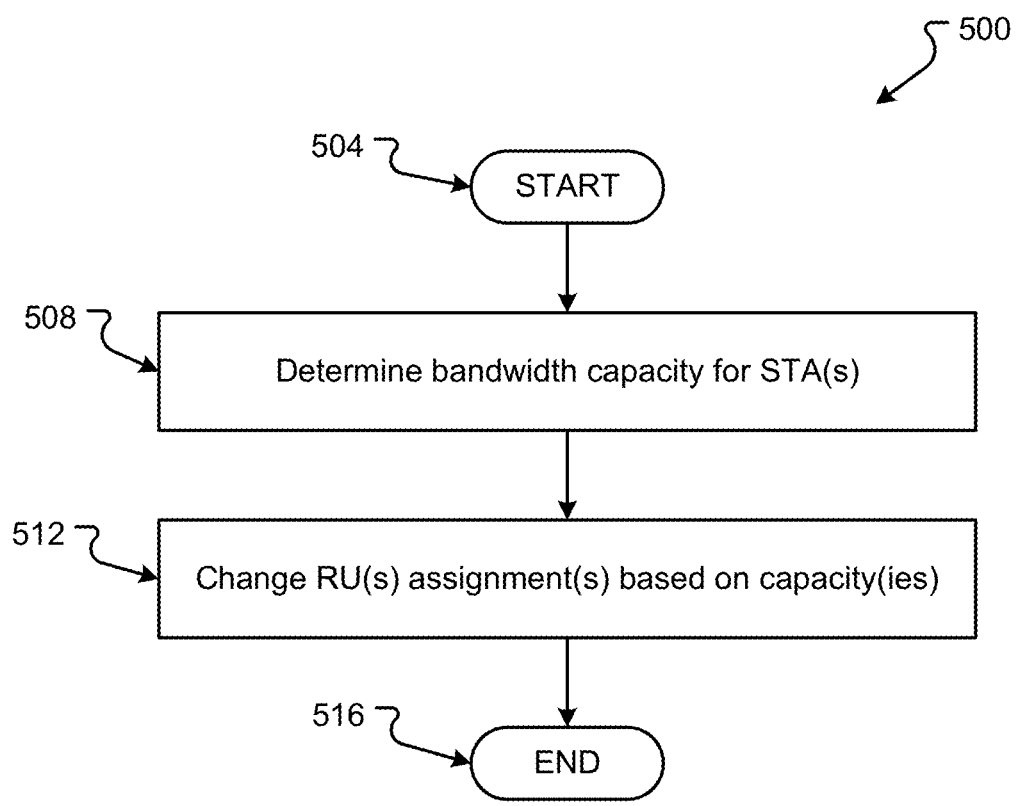
FIG. 5 illustrates a process for managing the radio resource in response to limitations to the bandwidth available to a station, as conducted at a AP, in accordance with aspects of the current disclosure.

An embodiment of a method 500 for changing or regulating the radio resource within the network in the environment 100 may be as shown in FIG. 5. Generally, the method 500 starts with a start operation 504 and ends with an end operation 516. The method 500 can include more or fewer steps or can arrange the order of the steps differently than those shown in FIG. 5. The method 500 can be executed as a set of computer-executable instructions, executed by a computer system or processing component, and be encoded or stored on a storage medium. Further, the method 500 can be executed by a gate or other hardware device or component in an ASIC, a FPGA, or other type of hardware device. Hereinafter, the method 500 shall be explained with reference to the systems, components, modules, software, data structures, etc. described herein.

An AP 104 and/or controller 101 may determine the amount of bandwidth capacity for each AP 104 communicating with STAs 108, in stage 508. Here, each of the different components 204 through 220 may be used to analyze the different configurations of the port 103*a*, the network 105, the switch 103*b*, any mesh network, any of the APs 104, etc. The determined bandwidth may be as described in conjunction with FIGS. 4A and/or 4B, and be assigned to each AP 104 or station 108 within the network in environment 100. The determined bandwidth may then be provided to the RRM bandwidth adjuster 224.

The RRM bandwidth adjuster 224 can then change the bandwidth assignments or allocations to each of the different APs 104 based on the capacities required or capabilities of those APs 104 to communicate upstream and downstream, in stage 512. These changing bandwidth allocations can be an assignment stored at the AP 104 or controller 101 based on the data as provided in FIGS. 4A through 4C.

In a configuration, the bandwidth allocation is set by changing the RU assignments provided to the STAs 108. Other changes to communications characteristics, besides changing the RU assignments, may also be used in conjunction or in the alternative to the change to RU assignments. These changed RU assignments, or other communication characteristics, ensure that the AP 104 provides, to the STAs 108, only that amount of bandwidth that may be able to be used in upstream or downstream communications. Thus, if an AP 104 has a restriction on the amount of bandwidth in an upstream port 103*a* or switch 103*b*, or other device or connection, the amount of wireless bandwidth allowed for the AP 104 may be limited or set to that amount of bandwidth allowed by the restriction.

Figure 6:
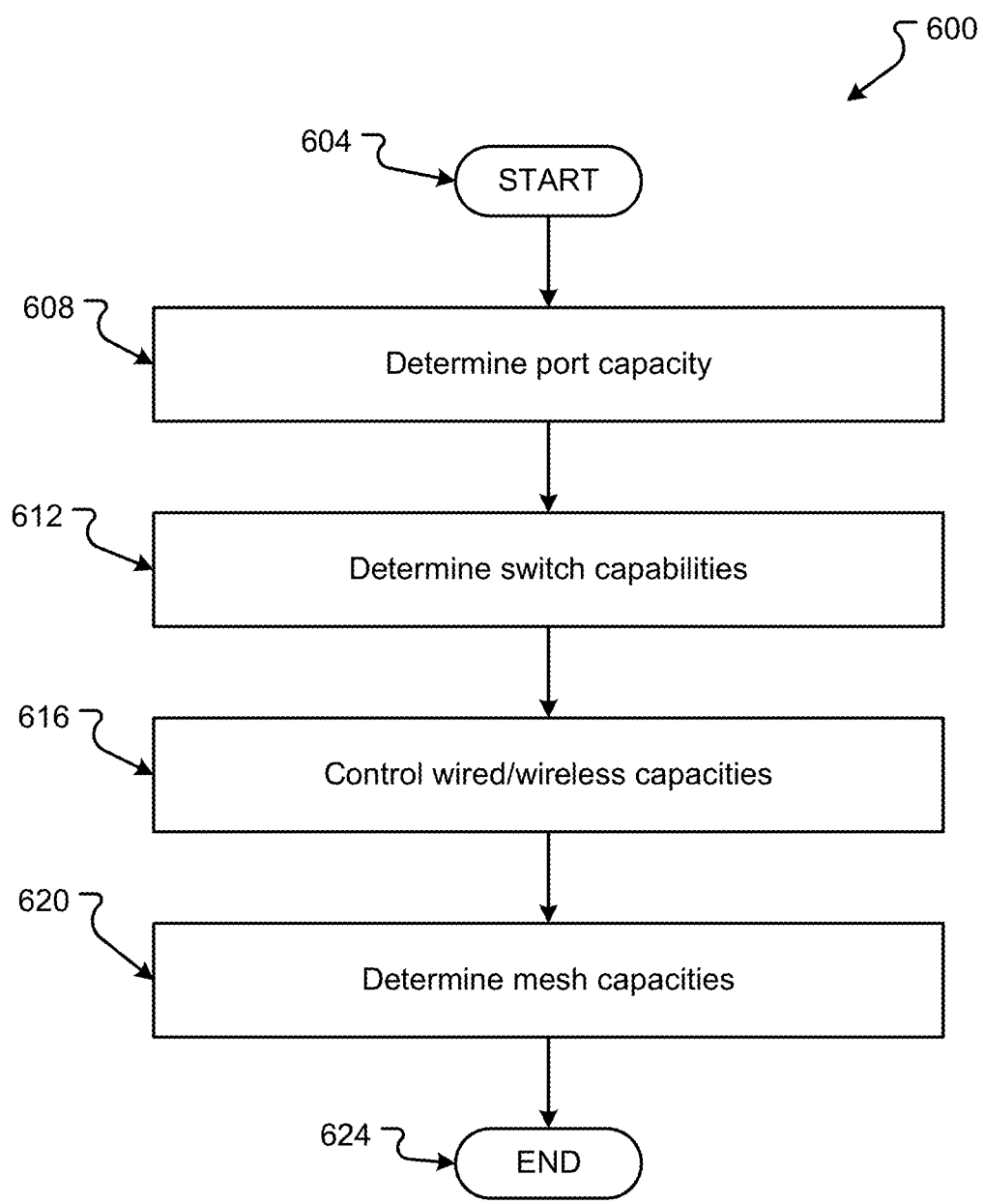
FIG. 6 illustrates another process for managing the radio resource in response to limitations to the bandwidth available to a station, as conducted at a AP, in accordance with aspects of the current disclosure.

An embodiment of a method 600 for determining the bandwidth capacities, from stage 508 described above, may be as shown in FIG. 6. Generally, the method 600 starts with a start operation 604 and ends with an end operation 624. The method 600 can include more or fewer steps or can arrange the order of the steps differently than those shown in FIG. 6. The method 600 can be executed as a set of computer-executable instructions, executed by a computer system or processing component, and be encoded or stored on a storage medium. Further, the method 600 can be executed by a gate or other hardware device or component in an ASIC, a FPGA, or other type of hardware device. Hereinafter, the method 600 shall be explained with reference to the systems, components, modules, software, data structures, etc. described herein.

The backhaul capacity analyzer 204 and/or the port capability analyzer 208 may determine the port capacity, in stage 608. Here, the port capability analyzer and/or backhaul capacity analyzer 204, 208 can analyze the port 103*a* to determine the one or more items of information in data structure 404. This information can include any egress bandwidth or other restrictions in the port capacity, which will be stored in data structure 404.

The switch analyzer 212 can then determine switch capabilities, in stage 612. The switch analyzer 212 can analyze the incoming or outgoing bandwidth and any other restrictions in the processing or data throughput of the switch. This information may be as stored in data structure 440 of FIG. 4*b*.

The wireless infrastructure capacity analyzer 216 may then control wired or wireless capacities. This control includes conducting such operations as limiting or capping the amount of MCS traffic in the network to reduce the overall bandwidth consumption in the network in environment 100 between any of the one or more APs 104 and/or the switch 103*b* or port 103*a*. This control is done, possibly, by reducing the number of Request To Send (RTS) or Clear To Send (CTS) messages and sending those at higher rates. Further, the wireless infrastructure capacity analyzer 216 can also throttle trigger frames to reduce or space out the amount of bandwidth usage in the network in environment 100. Further, the contention back-off parameters can be adjusted to change the amount of minimum/maximum back-off to allow for reliable message exchange with reducing the amount of bandwidth infrastructure as explained above. Further, the wireless infrastructure capacity analyzer 216 an also reduce the number of spatial streams being used in changing the total capacity of the radio being used to reduce the bandwidth based on the limited number of spatial streams.

The mesh analyzer 220 may then determine the mesh capabilities, in stage 612. Here, the mesh analyzer can analyze any type of mesh, for example, the mesh with APs 104*a* through 104*f*. The mesh capabilities can determine any type of traffic bridging, streaming, flow, link hops, etc. This information may be stored in data structure 468, as described in conjunction with FIG. 4C.

Figure 7A:
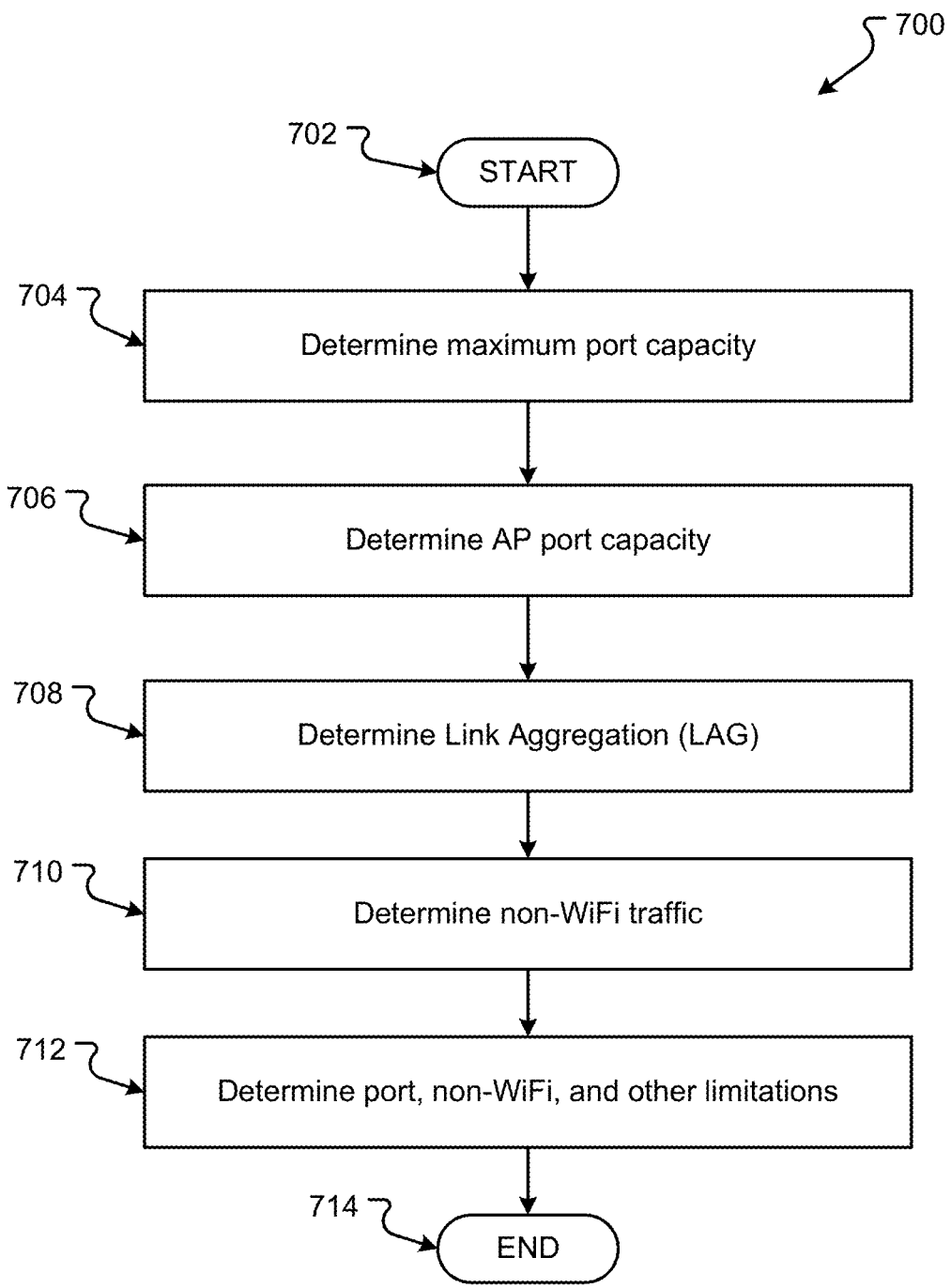
FIG. 7A illustrates another process for managing the radio resource in response to limitations to the bandwidth available to a station, as conducted at a AP, in accordance with aspects of the current disclosure.

An embodiment of a method 700 for determining the port capacities, in stage 608, may be as shown in FIG. 7A. Generally, the method 700 starts with a start operation 702 and ends with an end operation 714. The method 700 can include more or fewer steps or can arrange the order of the steps differently than those shown in FIG. 7A. The method 700 can be executed as a set of computer-executable instructions, executed by a computer system or processing component, and be encoded or stored on a storage medium. Further, the method 700 can be executed by a gate or other hardware device or component in an ASIC, a FPGA, or other type of hardware device. Hereinafter, the method 700 shall be explained with reference to the systems, components, modules, software, data structures, etc. described herein.

The port capability analyzer 208 can determine the maximum amount of port bandwidth. This determination may include using the backhaul capacity analyzer 204 to evaluate or determine the maximum amount of egress bandwidth from the port 103a to the network 105. This bandwidth may represent the maximum amount of bandwidth available to the port 103a. In other configurations, the max port capacity can be the amount of bandwidth amongst two or more ports 103a within the network 105, 100.

The port capability analyzer 208 can then determine the amount of capacity or bandwidth between any one or more APs 104 and the port 103a. In other words, this determination determines the amount of inflow traffic ability for the port 103a.

The port capability analyzer 208 may then determine the amount of link aggregation bandwidth. Link aggregation (LAG) can combine multiple Ethernet links into one logical link between two devices. As such, it may aggregate or determine a total amount of bandwidth being used by the data links between two or more devices in the network in environment 100. This amount of LAG may then be recorded in data structure 404 in data field 420.

The port capability analyzer may then determine the amount of non-Wi-Fi or data traffic being communicated between the devices, in stage 710. The non-Wi-Fi traffic can include any type of control information or other type of data being handled between two or more devices to provide the capability to communicate data. This information may then be stored as non-Wi-Fi traffic information in field 424 of data structure 404. Thereinafter, the amount of port capacity can be determined by the port capability analyzer 208 by taking a total port capacity similar to finding any non-Wi-Fi or other limitations as determined above. This result is provided as a total amount of capability or capacity that can be provided to the APs 104.

Figure 7B:
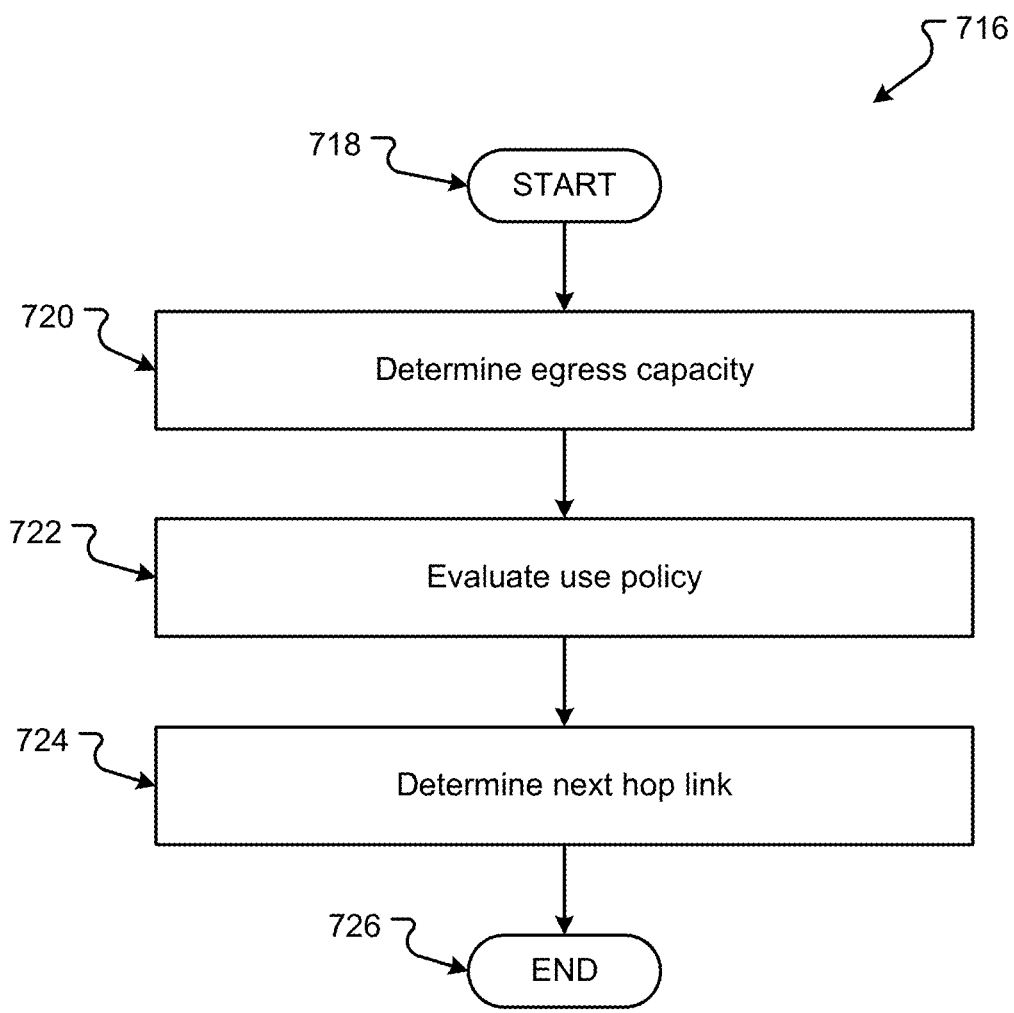
FIG. 7B illustrates another process for managing the radio resource in response to limitations to the bandwidth available to a station, as conducted at a AP, in accordance with aspects of the current disclosure.

An embodiment of a method 716 for determining the amount of switch capabilities may be as shown in FIG. 7B. Generally, the method 716 starts with a start operation 718 and ends with an end operation 726. The method 716 can include more or fewer steps or can arrange the order of the steps differently than those shown in FIG. 7B. The method 716 can be executed as a set of computer-executable instructions, executed by a computer system or processing component, and be encoded or stored on a storage medium. Further, the method 716 can be executed by a gate or other hardware device or component in an ASIC, a FPGA, or other type of hardware device. Hereinafter, the method 700 shall be explained with reference to the systems, components, modules, software, data structures, etc. described herein.

The switch analyzer 212 can determine the amount of egress capacity, in stage 720. Egress capacity can be the amount of bandwidth going from a switch 103b to the port 103a or to the network 105. This determined egress capacity can be a bandwidth that is stored in the data structure 440.

The switch analyzer 212 may then evaluate any user policy associated with the switch or AP, in stage 722. The user policy can determine how to interact with different neighboring APs 104, either within environment 100 or part of another BSS. This neighbor policy may request or require reducing the amount of bandwidth used by an AP 104 to allow that bandwidth to be provided to another AP 104 that has higher priority communications. In contrast, the neighbor policy can also require another AP 104 to provide bandwidth to the current AP 104 of the environment 100.

These policies may be evaluated to determine whether or not the system in environment 100 should attempt to limit AP bandwidth.

The switch analyzer 212 can determine the next hop link bandwidth, in stage 724. AP 104 can determine the amount of hop bandwidth between itself and another AP 104, between itself and the switch 103b, etc. This next hop link bandwidth is a direct indication of the amount of limited bandwidth within a mesh network or between the AP 104 and the switch 103b. This information may be stored in field 456 of data structure 440.

Figure 7C:
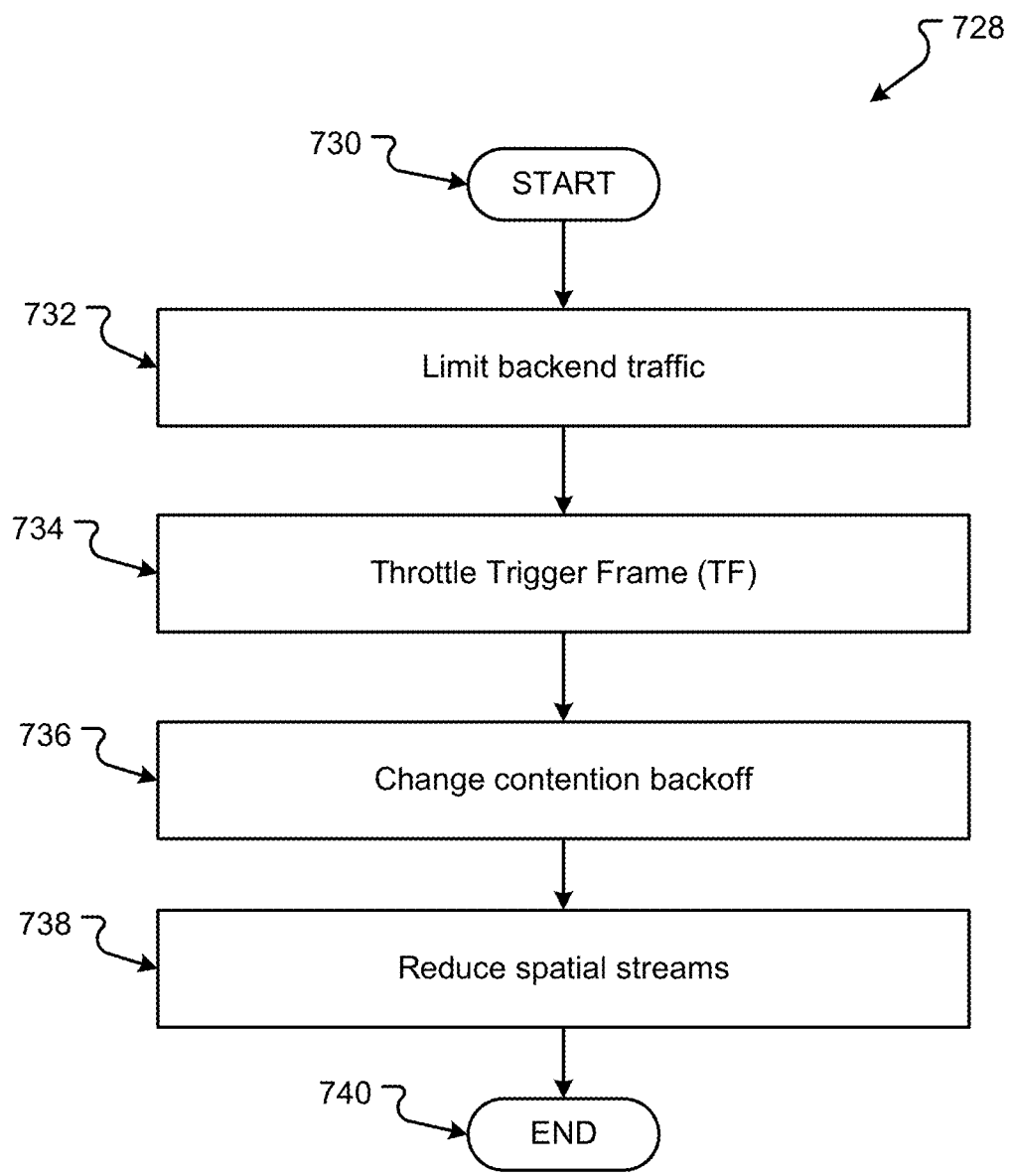
FIG. 7C illustrates another process for managing the radio resource in response to limitations to the bandwidth available to a station, as conducted at a AP, in accordance with aspects of the current disclosure.

An embodiment of a method 728 for controlling wireless capacities of stage 616 may be as shown in FIG. 7C. Generally, the method 728 starts with a start operation 730 and ends with an end operation 740. The method 728 can include more or fewer steps or can arrange the order of the steps differently than those shown in FIG. 7C. The method 728 can be executed as a set of computer-executable instructions, executed by a computer system or processing component, and be encoded or stored on a storage medium. Further, the method 728 can be executed by a gate or other hardware device or component in an ASIC, a FPGA, or other type of hardware device. Hereinafter, the method 728 shall be explained with reference to the systems, components, modules, software, data structures, etc. described herein.

The wireless infrastructure capacity analyzer 216 can first limit the amount of backend traffic, in stage 732. Here, the wireless infrastructure capacity analyzer 216 can limit the amount of control traffic between the AP 104 and wireless STAs 108 or between APs 104 or between other devices to cap or limit the amount of down links to a lower MCS rate. This reduces the amount of 802.11 overhead by reducing RTS/CTS messages or retries that may be operated at higher rates. This limited traffic helps to expand the amount of bandwidth that may be available to data traffic.

The wireless infrastructure capacity analyzer 216 may then throttle the amount of trigger frames, in stage 734. By throttling the number of trigger frames allowed, this allotted uplink transmissions from the AP 104 may be distributed or eliminated. Thus, by limiting or spacing out the number of trigger frames, the amount of bandwidth used for uplink transmissions may be controlled.

The wireless infrastructure capacity analyzer 216 can then change the contention back-off parameters, in stage 736. For example, $CW_{min}$ and $CW_{max}$ may be changed such that there is less conflict between messages and allows for more reliable message exchange even though there are fewer backend messages. This change then allows the wireless infrastructure capacity analyzer 216 to increase bandwidth by limiting backend control messages and still allow for reliable traffic because the contention back-off parameters have been increased.

The wireless infrastructure capacity analyzer 216 may then reduce the number of spatial streams, in stage 738. Any AP 104 can have various spatial streams that can direct communications to various devices. By limiting the number of spatial streams allowed or used, the AP 104 has a natural reduction in the amount of bandwidth, as fewer streams can be sent out.

Figure 7D:
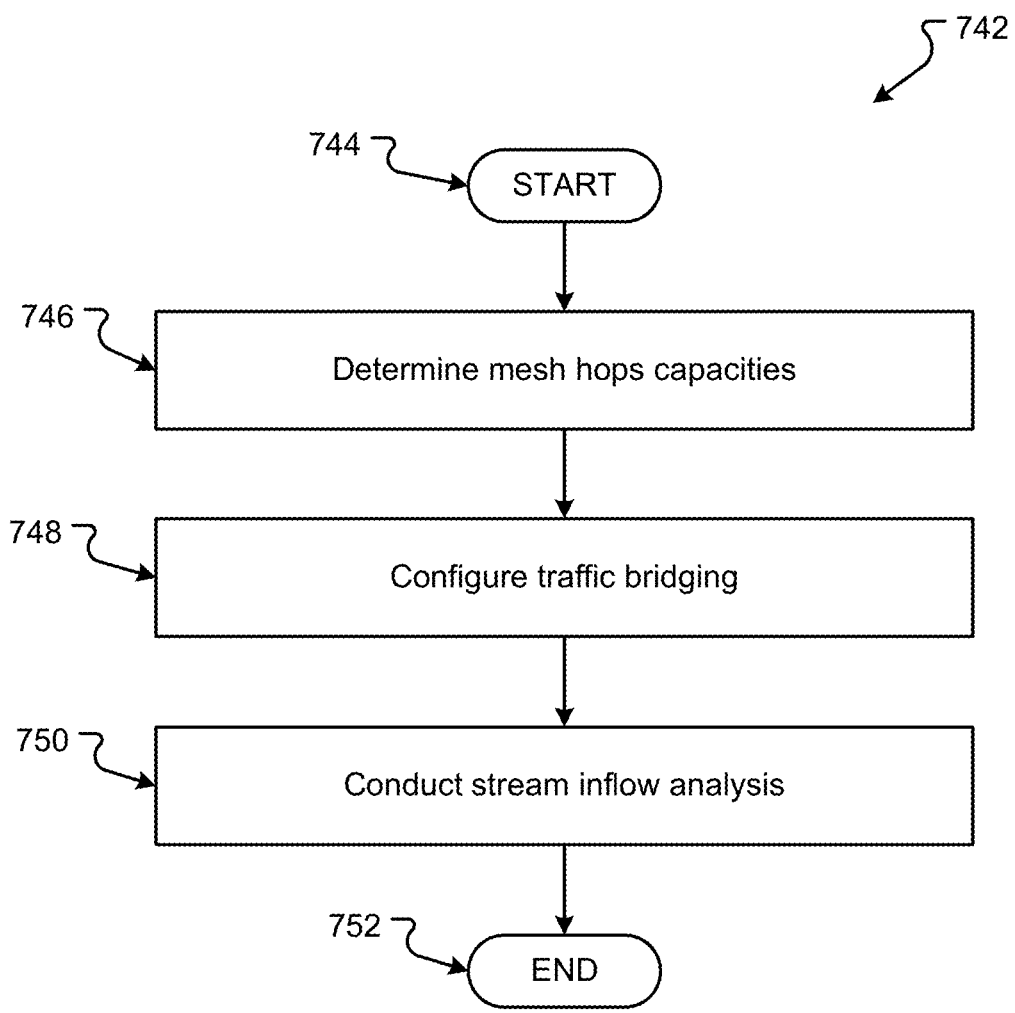
FIG. 7D illustrates another process for managing the radio resource in response to limitations to the bandwidth available to a station, as conducted at a AP, in accordance with aspects of the current disclosure.

An embodiment of a method 742 for determining mesh capability in stage 620 may be as shown in FIG. 7D. Generally, the method 742 starts with a start operation 744 and ends with an end operation 752. The method 742 can include more or fewer steps or can arrange the order of the steps differently than those shown in FIG. 7D. The method 742 can be executed as a set of computer-executable instructions, executed by a computer system or processing component, and be encoded or stored on a storage medium. Further, the method 742 can be executed by a gate or other hardware device or component in an ASIC, a FPGA, or other type of hardware device. Hereinafter, the method 742 shall be explained with reference to the systems, components, modules, software, data structures, etc. described herein.

The mesh analyzer 220 can determine the mesh hop capacity, in stage 746. Here, the mesh analyzer 220 can analyze the amount of bandwidth or traffic between any two APs 104 in the mesh, for example, between AP 104d and AP 104f. These hop capacities may be stored, along with the AP IDs, to determine a link and the link's capacity between the identified APs.

The mesh analyzer 220 can also configure the traffic bridging, in stage 748. The traffic bridging ensures that mesh sub tree nodes have enough bandwidth for communications amongst the nodes. It reduces the back independent mesh nodes bandwidth to reduce the amount of bandwidth allotted for those nodes 104 compared to other nodes 104. It ensures that traffic streams do not route to backend infrastructure and ensures a more fluid and efficient method for exchanging data in the mesh network.

The mesh analyzer 220 may then conduct a stream inflow, in stage 750. Stream inflow determines the amount of bandwidth inflow into an AP 104. These inflows can be analyzed to determine whether lower leaf mesh nodes require more bandwidth at higher connection links to perform properly. Otherwise, the lowest bandwidth is provided to each link in the mesh network, but allows for increasing the amount of bandwidth higher in the tree to allow the proper functioning of the lower nodes within the mesh tree.

FIG. 8 illustrates an embodiment of a communications device 800 that may implement one or more of APs 104, controllers 101, and/or STAs 108 of FIG. 1. In various embodiments, device 800 may comprise a logic circuit. The logic circuit may include physical circuits to perform operations described for one or more of APs 104, controllers 101, and STAs of FIG. 1, for example. As shown in FIG. 8, device 800 may include one or more of, but is not limited to, a radio interface 805, baseband circuitry 825, and/or computing platform 845.

The device 800 may implement some or all of the structures and/or operations for one or more of APs 104, controllers 101, and/or STAs 108 of FIG. 1, storage medium 855, and logic circuit in a single computing entity, such as entirely within a single device. Alternatively, the device 800 may distribute portions of the structure and/or operations using a distributed system architecture, such as a client-server architecture, a peer-to-peer architecture, a master-slave architecture, etc.

An radio interface 805, which may also include an analog front end (AFE), may include a component or combination of components adapted for transmitting and/or receiving single-carrier or multi-carrier modulated signals (e.g., including Complementary Code Keying (CCK), orthogonal frequency division multiplexing (OFDM), and/or Single-Carrier Frequency Division Multiple Access (SC-FDMA) symbols) although the configurations are not limited to any specific over-the-air interface or modulation scheme. The radio interface 805 may include, for example, a receiver 810 and/or a transmitter 815. Radio interface 805 may include bias controls, a crystal oscillator, and/or one or more antennas 820. In additional or alternative configurations, the radio interface 805 may use oscillators and/or one or more filters, as desired.

Baseband circuitry 825 may communicate with radio interface 805 to process, receive, and/or transmit signals and may include, for example, an Analog-To-Digital Converter (ADC) for down converting received signals with a Digital-To-Analog Converter (DAC) 830 for up converting signals for transmission. Further, baseband circuitry 825 may include a baseband or PHYsical layer (PHY) processing circuit for the PHY link layer processing of respective receive/transmit signals. Baseband circuitry 825 may include, for example, a Medium Access Control (MAC) processing circuit 835 for MAC/data link layer processing. Baseband circuitry 825 may include a memory controller for communicating with MAC processing circuit 835 and/or a computing platform 845, for example, via one or more interfaces 840.

In some configurations, PHY processing circuit may include a frame construction and/or detection module, in combination with additional circuitry such as a buffer memory, to construct and/or deconstruct communication frames. Alternatively or in addition, MAC processing circuit 835 may share processing for certain of these functions or perform these processes independent of PHY processing circuit. In some configurations, MAC and PHY processing may be integrated into a single circuit.

The computing platform 845 may provide computing functionality for the device 800. As shown, the computing platform 845 may include a processing component 850. In addition to, or alternatively of, the baseband circuitry 825, the device 800 may execute processing operations or logic for one or more of APs 104, controllers 101, and/or STAs 108, storage medium 855, and logic circuits using the memory components 855. The processing component 850 (and/or PHY and/or MAC 835) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, Application Specific Integrated Circuits (ASIC), Programmable Logic Devices (PLD), Digital Signal Processors (DSP), Field Programmable Gate Array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, Application Program Interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 845 may further include other platform components. Other platform components include common computing elements, such as one or more processors, multi-core processors, co-processors, memory units, chipsets, controllers, peripherals, interfaces, oscillators, timing devices, video cards, audio cards, multimedia Input/Output (I/O) components (e.g., digital displays), power supplies, and so forth. Examples of memory units 855 may include without limitation various types of computer readable and machine readable storage media in the form of one or more higher speed memory units, such as Read-Only Memory (ROM), Random-Access Memory (RAM), Dynamic RAM (DRAM), Double-Data-Rate DRAM (DDRAM), Synchronous DRAM (SDRAM), Static RAM (SRAM), Programmable ROM (PROM), Erasable Programmable ROM (EPROM), Electrically Erasable Programmable ROM (EEPROM), flash memory, polymer memory such as ferroelectric polymer memory, ovonic memory, phase change or ferroelectric memory, Silicon-Oxide-Nitride-Oxide-Silicon (SONOS) memory, magnetic or optical cards, an array of devices such as Redundant Array of Independent Disks (RAID) drives, solid state memory devices (e.g., Universal Serial Bus (USB) memory, Solid State Drives (SSD) and any other type of storage media suitable for storing information.

Device 800 may be, for example, an ultra-mobile device, a mobile device, a fixed device, a Machine-To-Machine (M2M) device, a Personal Digital Assistant (PDA), a mobile computing device, a smart phone, a telephone, a digital telephone, a cellular telephone, user equipment, eBook readers, a handset, a one-way pager, a two-way pager, a messaging device, a computer, a Personal Computer (PC), a desktop computer, a laptop computer, a notebook computer, a netbook computer, a handheld computer, a tablet computer, a server, a server array or server farm, a web server, a network server, an Internet server, a work station, a minicomputer, a main frame computer, a supercomputer, a network appliance, a web appliance, a distributed computing system, multiprocessor systems, processor-based systems, consumer electronics, programmable consumer electronics, game devices, display, television, digital television, set top box, wireless access point, base station, node B, subscriber station, mobile subscriber center, radio network controller, router, hub, gateway, bridge, switch, machine, or combination thereof. Accordingly, functions and/or specific configurations of device 800 described herein, may be included or omitted in various embodiments of device 800, as suitably desired.

Embodiments of device 800 may be implemented using Single Input Single Output (SISO) architectures. However, certain implementations may include multiple antennas (e.g., antennas 820) for transmission and/or reception using adaptive antenna techniques for beamforming or Spatial Division Multiple Access (SDMA) and/or using MIMO communication techniques.

The components and features of device 800 may be implemented using any combination of discrete circuitry, Application Specific Integrated Circuits (ASICs), logic gates and/or single chip architectures. Further, the features of device 800 may be implemented using microcontrollers, programmable logic arrays and/or microprocessors or any combination of the foregoing where suitably appropriate. It is noted that hardware, firmware, and/or software elements may be collectively or individually referred to herein as "logic," "circuit," or "processor."

The device in FIG. 8 can also contain a security module (not shown). This security module can contain information regarding, but not limited to, security parameters required to connect the device to another device or other available networks or network devices, and can include Wireless Equivalent Privacy (WEP) or Wi-Fi Protected Access (WPA) security access keys, network keys, etc., as discussed.

Another module that the device in FIG. 8 can include is a network access unit (not shown). The network access unit can be used for connecting with another network device. In one example, connectivity can include synchronization between devices. In another example, the network access unit can work as a medium which provides support for communication with other stations. In yet another example, the network access unit can work in conjunction with at least the MAC circuitry 835. The network access unit can also work and interact with one or more of the modules/components described herein.

It should be appreciated that the exemplary device 800 shown in the block diagram of FIG. 8 may represent one functionally descriptive example of many potential implementations. Accordingly, division, omission, or inclusion of block functions depicted in the accompanying figures does not infer that the hardware components, circuits, software and/or elements for implementing these functions would be necessarily be divided, omitted, or included in embodiments.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the elements illustrated in FIG. 1 may be integrated onto a single integrated circuit. Such a SOC device may include one or more processing units, graphics units, communications units, system virtualization units and various application functionality all of which may be integrated (or "burned") onto the chip substrate as a single integrated circuit. When operating via a SOC, the functionality described herein with respect to embodiments of the disclosure, may be performed via application-specific logic integrated with other components of computing device 800 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

Aspects of the disclosure comprise a method comprising: receiving, at a first Access Point (AP) of a first Basic Service Set (BSS), a signal from a second AP of a second BSS; determining, by the first AP, a Received Signal Strength Indicator (RSSI) associated with the second AP to determine if there is interference from the second AP; when there is interference, generating a joint schedule for the first AP and the second AP to manage how the first AP and second AP transmit or receive signals to mitigate the interference.

Any of the one or more above aspects, wherein the first AP and the second AP exchange an agreement to conduct joint scheduling.

Any of the one or more above aspects, wherein the agreement is a handshake signal.

Any of the one or more above aspects, wherein the first AP and the second AP elect the first AP as a master AP to generate the joint schedule.

Any of the one or more above aspects, wherein the second AP is a slave AP.

Any of the one or more above aspects, wherein the first AP and the second AP synchronize timing before following the joint schedule.

Any of the one or more above aspects, wherein the timing is synchronized using a Precision Time Protocol.

Any of the one or more above aspects, wherein the first AP receives data associated with the second AP to generate the joint schedule.

Any of the one or more above aspects, wherein the data associated with the second AP comprises one or more of an amount of activity at the second AP, a current resource unit (RU) assigned to the second AP, and/or an orthogonal frequency-division multiple access (OFDMA) schedule being followed by the second AP.

Any of the one or more above aspects, wherein the joint schedule provides an RU in which the second AP is to transmit or receive data.

Aspects of the disclosure further comprise an access point (AP) comprising: a radio operable to receive a signal from a second AP of a second Basic Service Set (BSS); a memory; a processor in communication with the memory and the radio, the processor operable to: determine a Received Signal Strength Indicator (RSSI) associated with the second AP to determine if there is interference from the second AP; when there is interference: send a handshake signal to the second AP as an agreement to conduct joint scheduling; and generate a joint schedule for the AP and the second AP to manage how the AP and second AP transmit or receive signals to mitigate the interference.

Any of the one or more above aspects, wherein the AP and the second AP elect the AP as a master AP to generate the joint schedule, and wherein the second AP is a slave AP.

Any of the one or more above aspects, wherein the AP and the second AP synchronize timing before following the joint schedule, and wherein the timing is synchronized using a Precision Time Protocol.

Any of the one or more above aspects, wherein the AP receives data associated with the second AP to generate the joint schedule, and wherein the data associated with the second AP comprises one or more of an amount of activity at the second AP, a current resource unit (RU) assigned to the second AP, and/or an orthogonal frequency-division multiple access (OFDMA) schedule being followed by the second AP.

Any of the one or more above aspects, wherein the joint schedule provides an RU in which the second AP is to transmit or receive data.

Aspects of the disclosure further comprise a basic service set comprising: a first access point operable to: receive a signal from a second AP of a second Basic Service Set (BSS); determine a Received Signal Strength Indicator (RSSI) associated with the second AP to determine if there is interference from the second AP; when there is interference: send a handshake signal to the second AP as an agreement to conduct joint scheduling; and generate a joint schedule for the AP and the second AP to manage how the AP and second AP transmit or receive signals to mitigate the interference.

Any of the one or more above aspects, wherein the AP and the second AP elect the AP as a master AP to generate the joint schedule, and wherein the second AP is a slave AP.

Any of the one or more above aspects, wherein the AP and the second AP synchronize timing before following the joint schedule, and wherein the timing is synchronized using a Precision Time Protocol.

Any of the one or more above aspects, wherein the AP receives data associated with the second AP to generate the joint schedule, and wherein the data associated with the second AP comprises one or more of an amount of activity at the second AP, a current resource unit (RU) assigned to the second AP, and/or an orthogonal frequency-division multiple access (OFDMA) schedule being followed by the second AP.

Any of the one or more above aspects, wherein the joint schedule provides an RU in which the second AP is to transmit or receive data.

Any of the one or more above aspects, wherein the bandwidth restriction is associated with an egress capacity of the AP.

Any of the one or more above aspects, wherein the egress capacity is a difference of, a product of Ethernet port capacity, of the AP, multiplied by a Link Aggregation data (LAG), minus an amount of 802.11 Management traffic overhead.

Any of the one or more above aspects, wherein the port capacity comprises as a product of a switch capability multiplied by a capacity allowed by a SD-WAN policy enforced by a user.

Any of the one or more above aspects, wherein a first node, in the mesh network, has a higher bandwidth allocation that a parent node of the first node.

Any of the one or more above aspects, wherein network traffic in the mesh network requires more bandwidth and is local to a sub-tree of the mesh network comprising the first node and one or more nodes below the first node.

What is claimed is:

1. A method comprising:
analyzing a bandwidth restriction in a communication stream of an Access Point (AP), wherein the bandwidth restriction is associated with a port in communication with the AP, wherein the bandwidth restriction associated with the port comprises a determined port capacity, wherein the determined port capacity is a difference between a port capacity and non-wireless traffic overhead, and wherein the port capacity comprises a product of a switch capability multiplied by a capacity allowed by a Software Defined-Wide Area Network (SD-WAN) policy enforced by a user, wherein the bandwidth restriction is associated with a mesh network to which the AP belongs and wherein the bandwidth restriction associated with the mesh network comprises a link hop bandwidth or a stream inflow bandwidth and wherein the bandwidth restriction is associated with a backhaul network in communication with the AP;
based on the bandwidth restriction, determining a lower amount of wireless bandwidth to provide to a Station (STA) wirelessly communicating to the AP; and
modifying a bandwidth allocation assigned to the STA based on the lower amount of wireless bandwidth wherein modifying the bandwidth allocation comprises reducing a number of spatial streams used by the AP based on the bandwidth restriction or modifying the Resource Unit (RU) allocation provided to the STA based on the bandwidth restriction.

2. The method of claim 1, wherein the bandwidth restriction is associated with a switch in communication with the AP.

3. The method of claim 2, wherein the bandwidth restriction associated with the switch comprises one or more of an egress capacity of the switch or a next hop link bandwidth.

4. The method of claim 1, wherein the bandwidth restriction is associated with an egress capacity of the AP.

5. The method of claim 4, wherein the egress capacity is a difference of, a product of Ethernet port capacity, of the AP, multiplied by a Link Aggregation data (LAG), minus an amount of 802.11 Management traffic overhead.

6. A access point (AP) comprising:
a radio operable to provide wireless bandwidth to a Station (STA) to send or receive a signal;
a memory;
a processor in communication with the memory and the radio, the processor operable to:
analyze a bandwidth restriction in a communication stream of the AP, wherein the bandwidth restriction is associated with a port in communication with the AP, wherein the bandwidth restriction associated with the port comprises a determined port capacity, wherein the determined port capacity is a difference between a port capacity and non-wireless traffic overhead, and wherein the port capacity comprises as a product of a switch capability multiplied by a capacity allowed by a Software Defined-Wide Area Network (SD-WAN) policy enforced by a user, wherein the bandwidth restriction is associated with a mesh network to which the AP belongs and wherein the bandwidth restriction associated with the mesh network comprises a link hop bandwidth or a stream inflow bandwidth and wherein the bandwidth restriction is associated with a backhaul network in communication with the AP;
based on the bandwidth restriction, determine a lower amount of wireless bandwidth to provide to the STA wirelessly communicating to the AP; and
modify a bandwidth allocation assigned to the STA based on the lower amount of wireless bandwidth wherein modifying the bandwidth allocation comprises reducing a number of spatial streams used by the AP based on the bandwidth restriction or modifying the Resource Unit (RU) allocation provided to the STA based on the bandwidth restriction.

7. The AP of claim 6, wherein the bandwidth restriction is:
associated with a switch in communication with the AP, and wherein the bandwidth restriction associated with the switch comprises one or more of an egress capacity of the switch or a next hop link bandwidth;
associated with a mesh network to which the AP belongs, and wherein the bandwidth restriction associated with the mesh network comprises a link hop bandwidth or a stream inflow bandwidth.

8. The AP of claim 6, wherein the bandwidth restriction is modified by suppressing higher Modulation and Coding Scheme (MCS) traffic.

9. The AP of claim 6, wherein modifying the bandwidth allocation assigned to the STA comprises reducing Uplink (UL) transmissions from the STA by throttling a number of Trigger Frames sent by the AP.

10. The AP of claim 6, further comprising increasing Contention Window Minimum (CWmin) or Contention Window Maximum (CWmax) to allow for reliable message exchange over a reduced backend infrastructure bandwidth.

11. The AP of claim 6, wherein the bandwidth restriction is associated with an egress capacity of the AP.

12. The AP of claim 11, wherein the egress capacity is a difference of, a product of Ethernet port capacity, of the AP, multiplied by a Link Aggregation data (LAG), minus an amount of 802.11 Management traffic overhead.

13. A non-transitory computer readable medium storing instructions which when executed perform a method comprising:
analyzing a bandwidth restriction in a communication stream of an Access Point (AP), wherein the bandwidth restriction is associated with a port in communication with the AP, wherein the bandwidth restriction associated with the port comprises a determined port capacity, wherein the determined port capacity is a difference between a port capacity and non-wireless traffic overhead, and wherein the port capacity comprises as a product of a switch capability multiplied by a capacity allowed by a Software Defined-Wide Area Network (SD-WAN) policy enforced by a user, wherein the bandwidth restriction is associated with a mesh network to which the AP belongs and wherein the bandwidth restriction associated with the mesh network comprises a link hop bandwidth or a stream inflow bandwidth and wherein the bandwidth restriction is associated with a backhaul network in communication with the AP;

based on the bandwidth restriction, determining a lower amount of wireless bandwidth to provide to a Station (STA) wirelessly communicating to the AP; and modifying a bandwidth allocation assigned to the STA based on the lower amount of wireless bandwidth wherein modifying the bandwidth allocation comprises reducing a number of spatial streams used by the AP based on the bandwidth restriction or modifying the Resource Unit (RU) allocation provided to the STA based on the bandwidth restriction.

14. The non-transitory computer readable medium of claim 13, wherein the bandwidth restriction is associated with a switch in communication with the AP.

15. The non-transitory computer readable medium of claim 14, wherein the bandwidth restriction associated with the switch comprises one or more of an egress capacity of the switch or a next hop link bandwidth.

16. The non-transitory computer readable medium of claim 13, wherein the bandwidth restriction is associated with an egress capacity of the AP, and wherein the egress capacity is a difference of, a product of Ethernet port capacity, of the AP, multiplied by a Link Aggregation data (LAG), minus an amount of 802.11 Management traffic overhead.

* * * * *